United States Patent [19]

Lauw

[11] Patent Number: 5,412,557
[45] Date of Patent: May 2, 1995

[54] UNIPOLAR SERIES RESONANT CONVERTER

[75] Inventor: Hian K. Lauw, Corvallis, Oreg.

[73] Assignee: Electronic Power Conditioning, Inc., Corvallis, Oreg.

[21] Appl. No.: 963,386

[22] Filed: Oct. 14, 1992

[51] Int. Cl.6 .................. H02M 5/458; H02M 7/5387
[52] U.S. Cl. ........................................ 363/37; 363/40; 363/98; 363/132
[58] Field of Search .................. 363/37, 98, 132, 40, 363/129, 131, 136; 323/222; H02M 5/458, 7/5387

[56] References Cited

U.S. PATENT DOCUMENTS

| | | | |
|---|---|---|---|
| 3,953,779 | 4/1976 | Schwarz | 321/2 |
| 4,096,557 | 6/1978 | Schwarz | 363/9 |
| 4,477,868 | 10/1984 | Steigerwald | 363/28 |
| 4,495,555 | 1/1985 | Eikelboom | 323/28 |
| 4,523,269 | 6/1985 | Baker et al. | 363/138 |
| 4,648,017 | 3/1987 | Nerone | 363/28 |
| 4,679,129 | 7/1987 | Sakakibara et al. | 363/17 |
| 4,695,933 | 9/1987 | Nguyen et al. | 363/17 |
| 4,727,469 | 2/1988 | Kammiller | 363/56 |
| 4,853,832 | 8/1989 | Stuart | 363/17 |
| 4,855,888 | 8/1989 | Henze et al. | 363/17 |
| 4,864,483 | 9/1989 | Divan | 363/37 |
| 4,942,511 | 7/1990 | Lipo et al. | 363/136 |
| 5,010,471 | 4/1991 | Klaassens et al. | 363/160 |
| 5,270,914 | 12/1993 | Lauw et al. | 363/160 |

OTHER PUBLICATIONS

Murai et al., "Pulse-Split Concept in Series Resonant DC Link Power Conversion for Induction Motor Drives," *Conference Proceedings* of the Industrial Application Society Meeting of 1991, pp. 776–781, (1991).

*Primary Examiner*—Steven L. Stephan
*Assistant Examiner*—Adolf Berhane
*Attorney, Agent, or Firm*—Klarquist Sparkman Campbell Leigh & Whinston

[57] ABSTRACT

A high efficiency static series resonant converter and method for converting power between two electric AC and/or DC circuits includes a resonant tank coupled to a link current synthesizer for generating a train of unipolar link current pulses with controllable duration zero and nonzero current segments. A blocking switch deactivates oscillation of the resonant tank in initiating each link current pulse, which is subsequently clamped by a buffer inductor. Each pulse is terminated by natural commutation through resonant oscillation. The pulses are substantially squarewave and have a high duty cycle leading to minimal peak current values. Minimal switching losses are incurred by switching at substantially zero voltage and zero current. Other features include blackout ride-through capability, bi-directional four quadrant operation, unbalanced load operation, voltage step-up without transformers, and input and output switch assemblies constructed from unidirectional switches, such as low-cost and robust single thyristors.

71 Claims, 11 Drawing Sheets

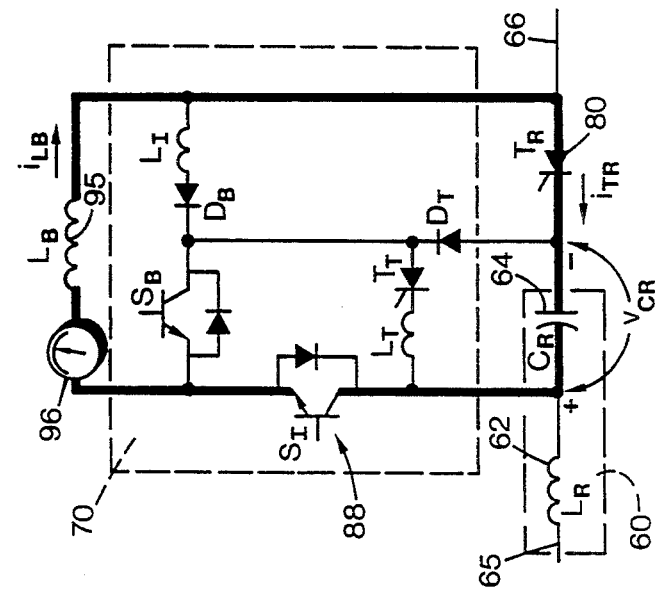
FIG. 10 $Z_t$-Mode ($t_2$)
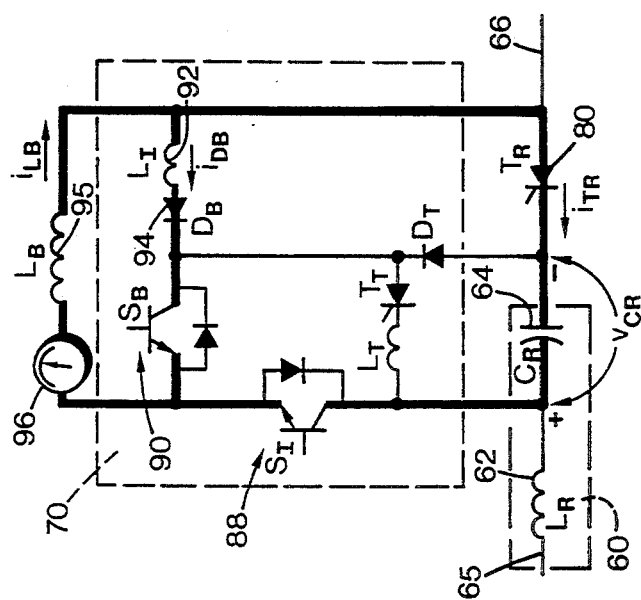
FIG. 9 $Z_t$-Mode ($t_1$-$t_2$)
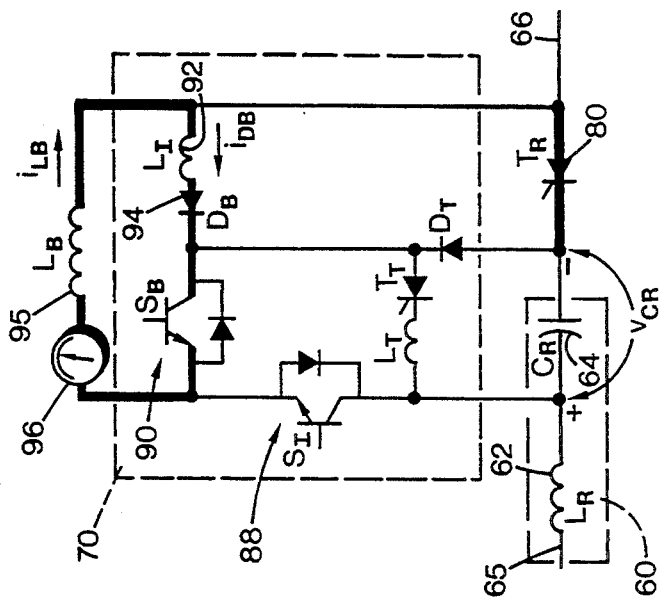
FIG. 8 $Z_s$-Mode ($t_0$)

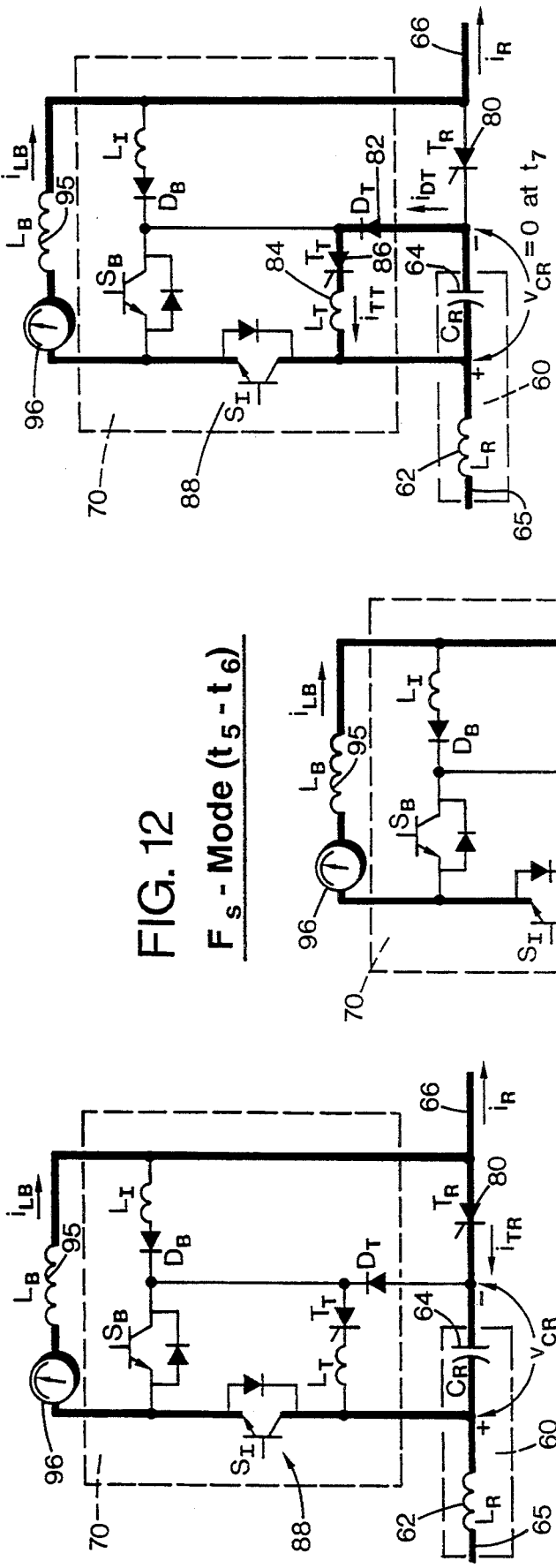
FIG. 13 $F_t$ - Mode ($t_6$-$t_7$)
FIG. 12 $F_s$ - Mode ($t_5$-$t_6$)
FIG. 11 I - Mode ($t_4$-$t_5$)

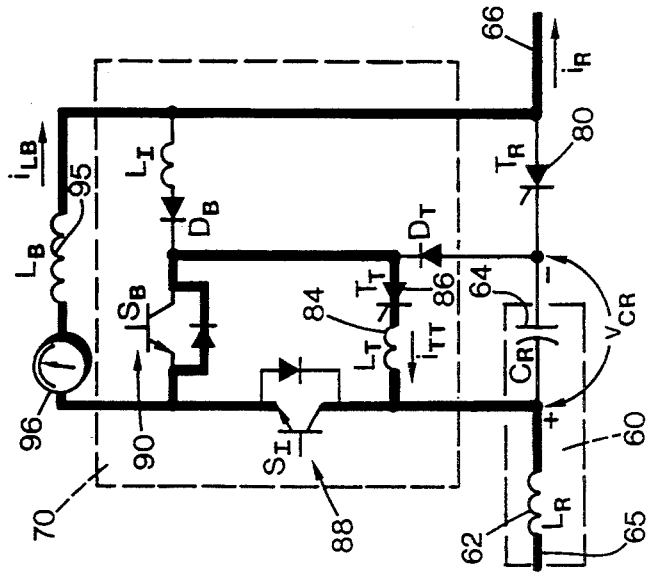
FIG. 16 T - Mode ($t_9$)
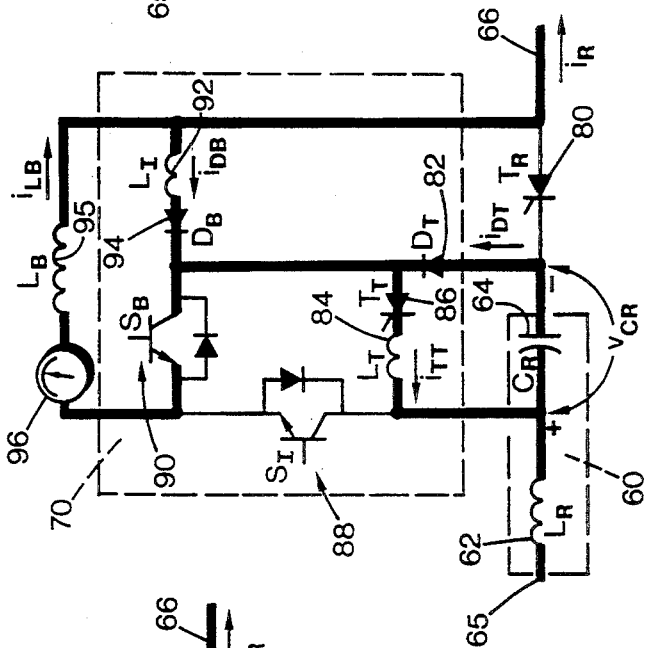
FIG. 15 $F_t$ - Mode ($t_7 - t_8$)
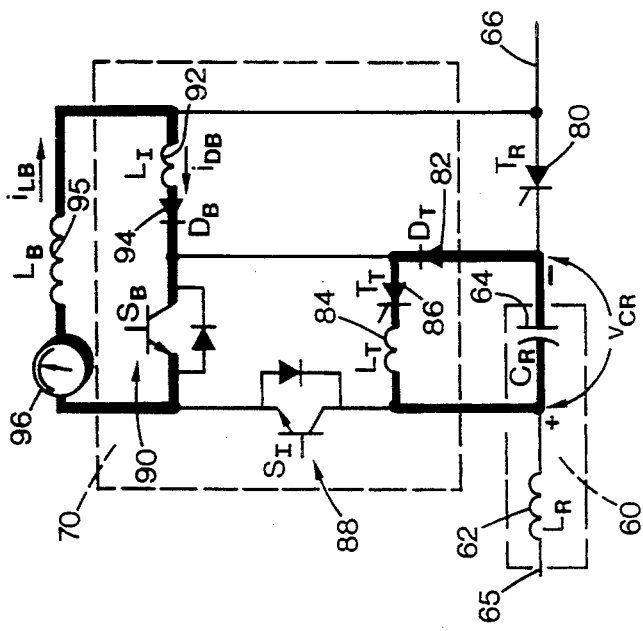
FIG. 14 $F_t$ - Mode ($t_7$)

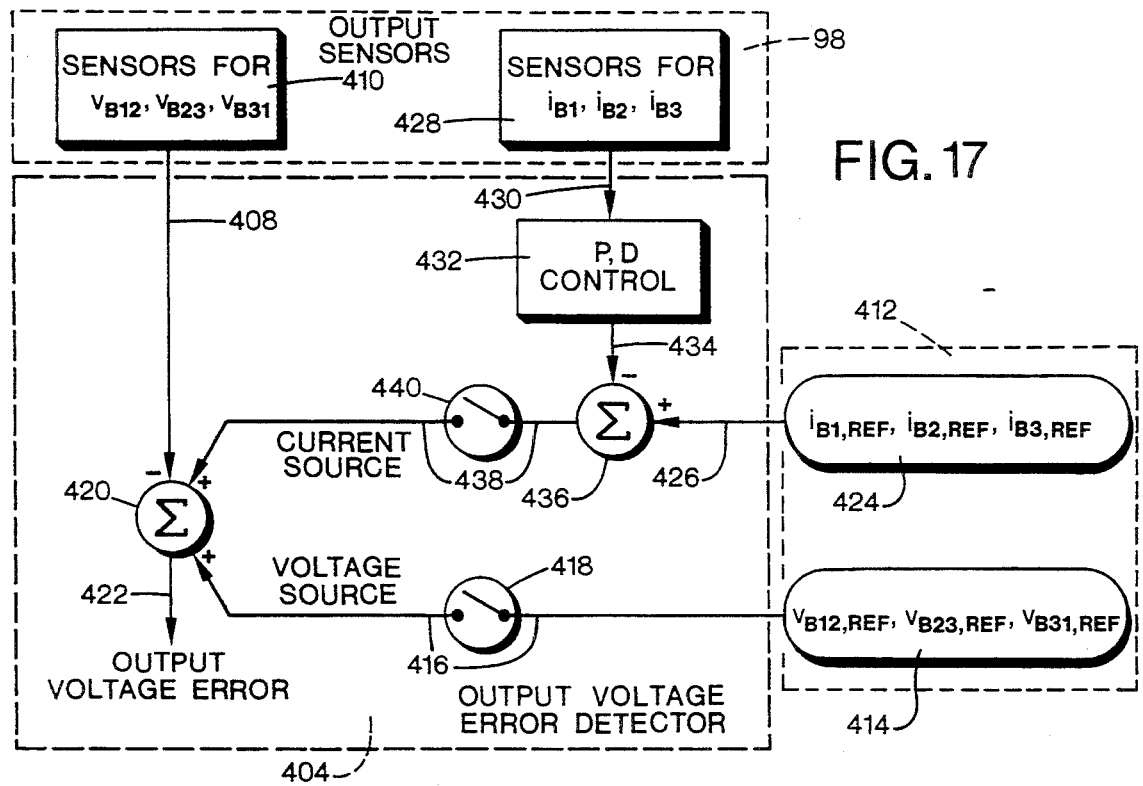
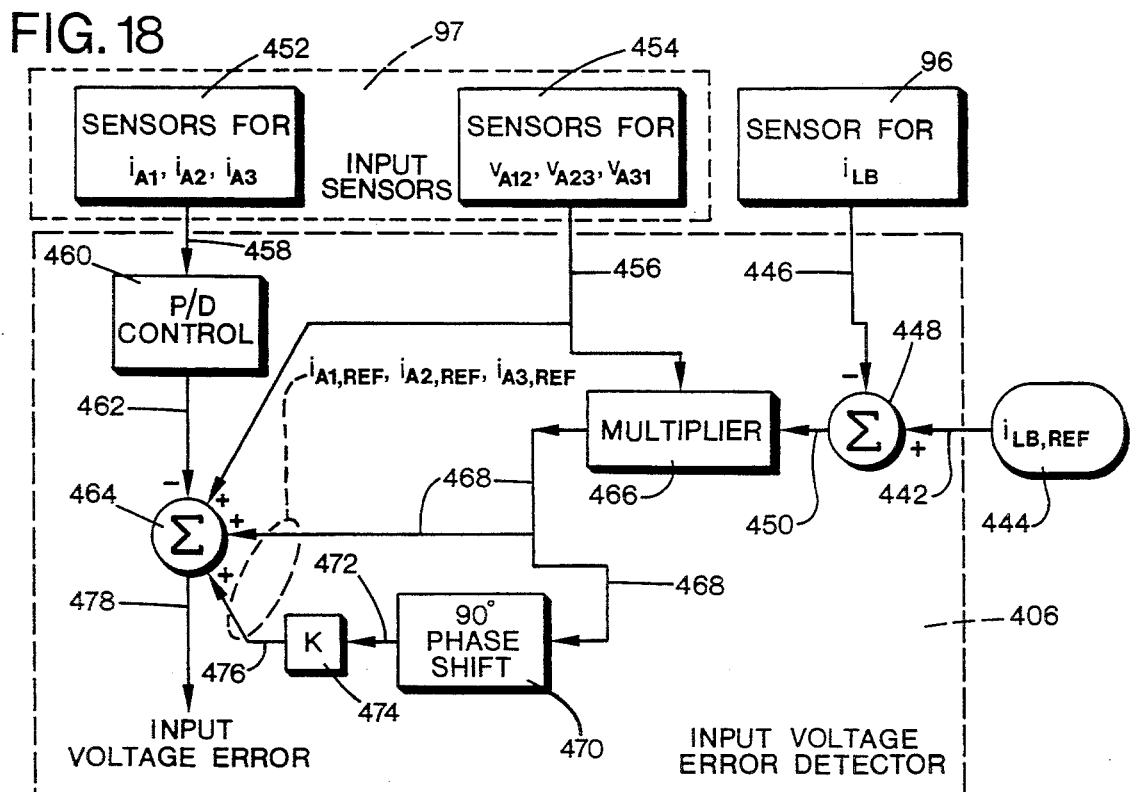

UNIPOLAR SERIES RESONANT CONVERTER

BACKGROUND OF THE INVENTION

The present invention relates generally to a static power converter, and a method of exchanging energy and converting power between two electric power circuits, such as a utility grid and a load, and more particularly to a unipolar series resonant converter for use in a high power, multi-kilowatt system for providing direct current (DC) or alternating current (AC) output power from either an AC or a DC power source.

Typically, converters are used to couple an electric load with a power source. For example, converters are used with uninterruptible power supplies, arc furnaces, and induction motor drives. During operation, the converters and their loads generate harmful harmonic currents which can cause voltage spikes on the power utility grid. These spikes can damage the equipment of other customers receiving power from the utility. Computers are especially vulnerable to damage from voltage spikes caused by these harmonic currents.

Filters are often used between the utility grid and the converter, as well as between the converter and the load, but filters are very expensive, both in terms of initial installation and operating costs. For example, a five horsepower induction motor may cost $150, whereas the converter costs $2,000 and the filters $1,000. Thus, engineers have focused on improving converter designs to decrease the initial cost of an induction motor drive installation. A variety of earlier resonant converters are described in various patents and publications, such as the textbook by Mohan, Undeland and Robbins: *Power Electronics: Converters, Applications and Design,* (John Wiley & Sons, 1989), pages 154–200.

Basically, a traditional resonant converter has input and output switch assemblies coupled together by at least one resonant circuit or "resonant tank." Filters are often coupled to the input and output switch assemblies. The switch assemblies are groups of semiconductor switches, such as (listed in order of increasing cost) diodes, thyristors, gate-assisted turnoff thyristors (GATTs), gate turn off thyristors (GTOs), insulated gate bipolar transistors (IGBTs), and metal oxide semiconductor field effect transistors (MOSFETs).

The resonant circuit of a traditional resonant converter facilitates what has come to be known as "soft switching." In soft switching, the semiconductors are switched at substantially zero current, termed "zero current switching" (ZCS), or at substantially zero voltage, called "zero voltage switching" (ZVS), or with a combination of ZCS and ZVS. As a result, lower switching losses are incurred during soft switching than in traditional "hard" switching schemes, and such low switching losses facilitate faster switching (on the order of 20 kHz, as opposed to one kilohertz with hard switching). Thus, significantly higher switching frequencies are achieved in resonant converters.

The high frequency soft switching capability of resonant converters is often exploited to minimize harmonic distortion of voltage and current waveforms at both the input and output of the converter. High frequency soft switching also dispenses with the need for bulky and expensive low order harmonic filters. Moreover, the size and weight of magnetic and electrostatic components associated with the power electronic energy conversion process are also reduced.

There are many kinds of resonant converters, particularly at the low end of the power spectrum, for example, a few hundred watts or less. However, in high power multi-kilowatt applications, less options are available to the converter designer in the way of devices and sophisticated circuit topologies. Thus, it is more difficult to design a low cost high power converter capable of running at high conversion efficiency.

Two classes of high power resonant converters have demonstrated some success, specifically:
  1. Series resonant converters, and
  2. Parallel resonant converters.

A combination of these classes has been proposed as well. The fundamental difference between these two converter classes is the manner in which power is transferred through the converter to the load. For a parallel resonant converter, the load terminals are in parallel with a resonant capacitor within the resonant tank. For a series resonant converter, the load terminals are in series with the resonant tank capacitor. In either the series or parallel resonant convertors, the load may be coupled either directly to the resonant capacitor, or indirectly through switches and other storage elements.

Conceptionally, the resonant circuit serves as a link between the input and output of the converter. The resonant circuit is controlled to generate a train of pulses which may have constant or varying pulse and cycle widths. The fundamental frequency of these pulses, defined herein as the "link frequency," is chosen to be significantly higher than the frequency of the input and output voltages or currents. The converter receives the input power at an input frequency, and converts the input power into a train of pulses, defined herein as the "link power." This link power is then converted again to obtain the output power at a selected output frequency. Either the input power, the output power, or both may be DC power (that is, power having currents and voltages with zero frequency).

The different topologies of the earlier resonant converters use different kinds of semiconductors. The lowest cost semiconductors are robust controlled rectifiers, also known as thyristors. Thyristors are useful for resonant converters only if two operating conditions are met, specifically, if:
  1. Current flowing through the device is turned off by natural commutation; and
  2. The device is subjected to a sufficient back bias voltage for a sufficient duration (turn off time).

Thyristors are unsuitable in high power resonant converters if the link frequency is so high that the device turn off time leads to an unacceptable duty cycle of the link current or voltage pulses. However, today's thyristors have a frequency ceiling beyond the audible frequency range (about 20 Khz), and are acceptable for most high power applications if the two operating conditions above are met. If either condition is not satisfied, then the more expensive controllable turn off switches such as GTOs, power MOSFETs and IGBTs must be used. As opposed to thyristors which only have a controllable turn on time, the GTOs, MOSFETs and IGBTs all have both controllable turn on and turn off times, activated by simply applying and removing gate driver signals.

In parallel resonant converters, the link pulse train is usually formed by unipolar (or unidirectional) voltage pulses, and usually requires controllable turn off switches which are turned off at substantially zero switch voltage. An example of such a parallel resonant converter is described in the 1989 U.S. Pat. No. 4,864,483 to Divan.

In series resonant converters, the link pulse train is formed by either AC or unipolar (unidirectional) current pulses. Several conventional series resonant converters employing AC link current pulses, are disclosed in the following U.S. Patent Nos.:

U.S. Pat. No. 3,953,779 to Schwarz (1976)
U.S. Pat. No. 4,096,557 to Schwarz (1978)
U.S. Pat. No. 4,495,555 to Eikelboom (1985)
U.S. Pat. No. 4,523,269 to Baker et al. (1985)
U.S. Pat. No. 4,648,017 to Nerone (1987)
U.S. Pat. No. 4,679,129 to Sakakibara et al. (1987)
U.S. Pat. No. 4,695,933 to Nguyen (1987)
U.S. Pat. No. 4,727,469 to Kammiller (1988)
U.S. Pat. No. 4,853,832 to Stuart (1989)

The more expensive controllable turn off switches (e.g. GTOs, IGBTs), are not needed because the link pulses are current pulses which cause the thyristors to turn off at substantially zero current, a performance characteristic known as "natural commutation." To accommodate the flow of these AC link current pulses, both the input and output switch assemblies must consist of bi-directional switches, such as two antiparallel coupled thyristors. For example, such a series resonant converter designed for three phase AC input and output with regenerative capability, requires twelve pairs of antiparallel switches. A significant improvement was invented by Klaassens and Lauw, as disclosed in U.S. Pat. No. 5,010,471. By roughly doubling the peak value of the AC link current through the conventional series resonant converter, Klaassens and Lauw replace the full bridge configuration of the input and output switch assemblies with a half bridge configuration. The resulting Klaassens/Lauw converter needs only half the number of switches of a conventional full bridge series resonant converter, whether considering bi-directional or antiparallel pairs of unidirectional switches.

Because series resonant converters employing AC link current pulses use bi-directional switches, or antiparallel pairs of unidirectional switches, saturable inductors must be inserted in series with each switch. The saturable inductors avoid the well known dv/dt turn on disturbances of thyristors, i.e. unscheduled thyristor turn on caused by an excessive rate of change of the anode to cathode voltage. The high number of saturable inductors, as well as the usual parallel capacitive snubbers, both increase the cost, size and volume of the converter. Furthermore, these saturable inductors force the designer to use switches with a higher reverse blocking voltage capability. The designer must also increase the minimum duration of the idle segment of the link current pulse beyond the turn off time as specified by the thyristor manufacturer. Another drawback are the losses incurred during turn on of the switches. These turn on losses occur because the voltages across the switches are not substantially zero when current begins to flow through the switches.

In U.S. Pat. No. 4,942,511 to Lipo and Murai propose a DC link series resonant converter which employs unipolar (unidirectional) link current pulses, rather than AC link current pulses. The Lipo/Murai converter provides a DC current bias to the resonant current pulses. Since the link currents are unipolar, only unidirectional switches are needed. Thus, like the Klaassens/Lauw half bridge series resonant converter, the Lipo/Murai converter only requires half the number of unidirectional switches as needed by conventional series resonant converters.

In the Lipo/Murai converter, even though each pulse cycle of the link current returns to zero naturally, the thyristors of the unidirectional switches are not exposed to a firm back bias voltage. This condition forces the thyristors to be kept at zero current for a duration longer than the manufacturer-specified turn off time. Thus, the Lipo/Murai converter violates the second thyristor operating condition (2) mentioned above. As a result, when compared with a conventional series resonant converter (for equal pulse cycle width and average values over the entire pulse cycle), the Lipo/Murai converter must generate link current pulses with a significantly higher peak value. The other option for the Lipo/Murai converter is to use the more expensive controlled turn off switches, rather than thyristors.

In spite of the superior performance of soft switching series resonant converters over converters employing hard switching circuitry, there still is a need for crucial improvements to series resonant converter technology. For example, one of the most critical barriers to the commercial success of series resonant converters is that the link current pulses must have extremely high peak values. Depending on the type of series resonant converter used, the peak value of the link current pulses may reach three to nine times the peak value of the maximum output current demanded by the load.

This phenomena of high link current pulse peaks stems from the use of sinusoidal current pulses which are generated entirely through resonant oscillation of the resonant circuit. One solution is proposed by Murai, Nakamura, Lipo and Aydemir in the article, "Pulse-split Concept in Series Resonant DC Link Power Conversion for Induction Motor Drives," submitted to the Industrial Application Society Meeting of 1991. Lipo and Murai attempted to improve the converter circuitry by modifying the waveform of the link current pulses as described in their U.S. Pat. No. 4,942,511. The Lipo/Murai converter uses a saturable reactor with a biasing current to limit the peak value of the resonant current pulses. However, the Lipo/Murai converter still causes the thyristors to be operated in violation of the second condition mentioned above, that is, the thyristors are not subjected to a sufficient back bias voltage for a sufficient duration. As a result, the use of thyristors for Lipo/Murai's converter still leads to an excessive ratio of the peak value and average value of the link current pulses. Since the link current is still too high, the Lipo/Murai converter is very expensive because the converter price is directly proportional to the link current value.

U.S. Pat. No. 4,477,868 to Steigerwald discloses another type of series resonant converter which limits the peak value of the link current pulses to moderate values. However, the Steigerwald converter is unfortunately restricted to nonregenerative applications, and only DC input and output power. Moreover, the Steigerwald converter expects the input power to behave as a current source. The Steigerwald converter uses expensive controllable turn off switches (GTOs), rather than thyristors, to convert the DC input current waveform into alternating square waves.

In summary, there are three main types of converters. First came the general linear mode converters, which suffered very high switching losses. Second, resonant converters were developed for high power applications, such as the Schwarz converters. The resonant converters relied on resonant circuits to reduce switching losses, but they still suffered from high peak current losses. The Lipo/Murai resonant unipolar converter falls in this category. Third, quasiresonant converters were developed to take advantage of the best characteristics of both linear and resonant converters, such as the parallel resonant converter developed by Divan. These earlier quasiresonant converters required many expensive controllable turn off switches.

Thus, a need exists for an improved series resonant converter and method of exchanging energy and converting power between single phase, three phase, and/or DC power sources and/or loads, which is directed toward overcoming, and not susceptible to, the above limitations and disadvantages.

SUMMARY OF THE INVENTION

According to one aspect of the present invention, a unipolar series resonant converter is provided for exchanging energy and converting power between first and second circuits. The unipolar series resonant converter of the present invention belongs to the class of quasiresonant converters. This converter includes first and second switch assemblies for coupling to the respective first and second circuits. The converter has a resonant tank coupled between the first and second switch assemblies. The resonant tank has a resonant capacitor and a resonant inductor coupled in series. A link current synthesizer is coupled to the resonant capacitor. The synthesizer is responsive to a synthesizer control signal for generating a link current comprising a train of unipolar link current pulses. Each link current pulse has zero and nonzero current segments. The zero and nonzero current segments of each link current pulse are controllable in duration. The converter also has a blocking switch in series with the resonant capacitor for deactivating oscillation of the resonant tank in initiating each unipolar link current pulse. The converter also has a link current buffer device coupled to the synthesizer for limiting a peak value of the link current to a selected value during energy exchange.

According to another aspect of the present invention, a method of converting power between first and second circuits is provided. The method includes the step of synthesizing a link current comprising a train of substantially squarewave unipolar link current pulses which are initiated and terminated through resonant oscillations, with each pulse having a zero amplitude segment and a nonzero amplitude segment. In a controlling step, the duration of zero amplitude segment and the nonzero amplitude segment of each link current pulse are controlled to selected values.

According to further aspects of the present invention, a link current synthesizer is provided, as well as a controller for controlling switches of a unipolar series resonant converter as described above.

It is an overall objective of this invention to provide an improved series resonant converter which is economically competitive with earlier static power converters while maintaining attractive features of series resonant converters, such as bi-directional and four quadrant operation, power transfer from lower to higher voltages (step up mode), generation of balanced sinusoidal output voltages insensitive to unbalanced loading, and tolerance to dynamic changes of supply voltages.

An additional object of the present invention is to provide a series resonant converter for converting DC power or AC power, whether single phase or poly phase, efficiently into DC power, or single phase or poly phase AC power.

A further object of the present invention is to provide an improved method of converting power between two electric circuits, such as a utility grid and a load having regeneration capability.

Another objective of the present invention is to provide a series resonant converter, and a method of converting power between two circuits, which minimizes switching losses of all switches used in the converter.

Yet another objective of this invention is to provide a series resonant converter, and a method of converting power between two circuits, which flexibly controls the link current pulse height, width and cycle width.

Still another objective of this invention is to provide a series resonant converter which maintains high efficiency when operating at less than full load conditions.

The present invention relates to the above features and objects individually as well as collectively. These and other objects, features and advantages of the present invention will become apparent to those skilled in the art from the following description and drawings.

BRIEF DESCRIPTION OF THE DRAWINGS

FIGS. 8-16 are schematic diagrams of the link current synthesizer of FIGS. 1-4, with the current path shown in heavy black lines during the times shown in FIG. 7 for the following converter modes of operation:

FIG. 8 shows a steady $Z_S$-mode at $t_0$;

FIG. 9 shows a transitional $Z_t$-mode ($t_1$ to $t_2$);

FIG. 10 shows a transitional $Z_t$-mode at $t_2$;

FIG. 11 shows an I-mode ($t_4$ to $t_5$);

FIG. 12 shows an $F_S$ steady mode ($t_5$ to $t_6$);

FIG. 13 shows an $F_t$ transitional mode ($t_6$ to $t_7$);

FIG. 14 shows an $F_t$ transitional mode at $t_7$;

FIG. 15 shows an $F_t$ transitional mode ($t_7$ to $t_8$);

FIG. 16 shows a T-mode at $t_9$.

FIG. 17 is a schematic block diagram of one form of an output voltage error detector portion of the FIG. 6 controller, shown for operation as an adjustable voltage source, and as an adjustable current source.

FIG. 18 is a schematic block diagram of one form of an input voltage error detector portion of the controller of FIG. 6.

DETAILED DESCRIPTION OF PREFERRED EMBODIMENTS

Figure 1:
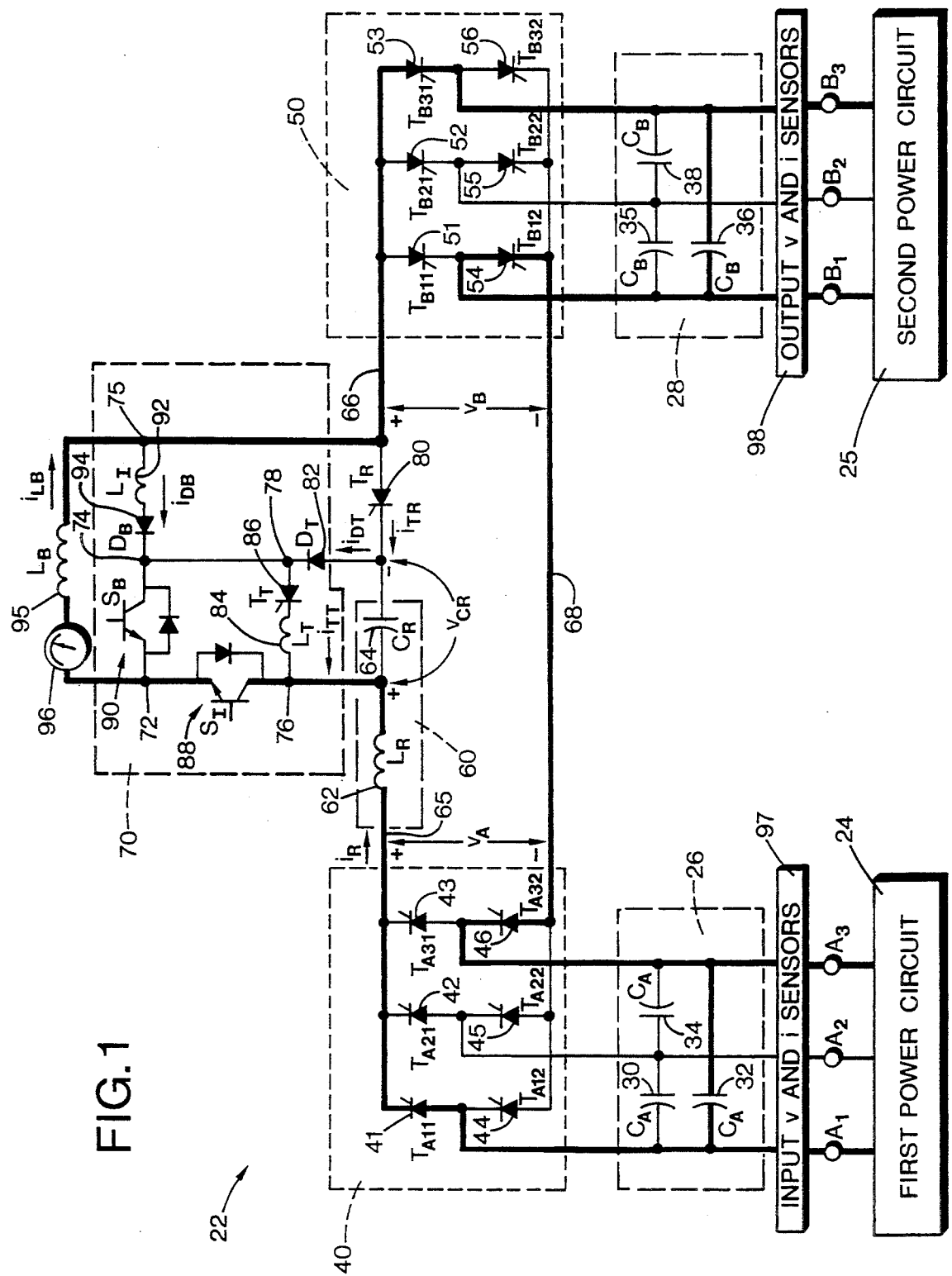
FIG. 1 is a schematic block diagram of one form of a unipolar series resonant converter of the present invention illustrated in a three phase AC to AC implementation with bi-directional, four quadrant operation.

FIG. 1 illustrates a first embodiment of a unipolar series resonant converter 22 constructed in accordance with the present invention for exchanging energy between first and second electric circuits 24 and 25. The circuits 24 and 25 may be: a power source, such as a utility power grid, an industrial power grid, or and on-board system grid for vehicles, aircraft, ships and the like; an energy storage device; or a load having regeneration capability.

For the purposes of discussion, the first circuit 24 is assumed to be a grid, and the second circuit 25 is assumed to be a load which may be capable of power regeneration. In the converter 22 embodiment, both the first and second circuits 24 and 25 are polyphase, here three phase, AC circuits. Other embodiments discussed below illustrate the converter's versatility to also efficiently convert single phase AC power, as well as DC power, also known as "zero frequency" AC power.

Definitions

The term "unipolar" refers to the direction of link current pulses flowing through the converter 22, which all flow in the same direction, irrespective of the direction of power flow, to satisfy power balance equations for the converter 22. The pulses may be routed to be positive or negative at the first and second electric circuits 24 and 25 as required to track a selected reference. This process is referred to herein as "routing of the unipolar link current pulses." It is apparent that transferring power over time between the first and second circuits 24 and 25 is equivalent to exchanging energy therebetween.

Regarding the terminology used herein, the characters "L" and "C" are used with various subscripts to denote inductors and capacitors, respectively. The preferred embodiment of this invention is implemented with three types of switches, indicated by the characters: "D" for diodes, "T" for thyristors, and "S" for controllable turn off switches, each provided with subscripts to refer to the particular switches. A controllable turn off switch is defined as a switch which may be controlled to turn on and off by respectively applying and removing their gate driver signals, such as a bipolar junction transistor, gate turn off thyristor (GTO), insulated gate bipolar transistor (IGBT), and metal oxide semiconductor field effect transistor (MOSFET), or their structural equivalents known to those skilled in the art.

It is apparent that the thyristors illustrated in the preferred embodiment may be replaced with controllable turn off switches with a few modifications where required. For example, for a MOSFET or an IGBT, the reverse current flow through the switch may be blocked, and excessive back bias voltage across the switch prevented, by connecting, for instance, a diode in series with the switch. Such an additional diode is not required if the illustrated thyristors are replaced with GTOs. Although the turn off time of thyristors is slower than controllable turn off switches, thyristors are preferred over more expensive controllable turn off switches of the same rating to provide a more economical converter 22.

First Embodiment

The unipolar series resonant converter 22 is first discussed assuming a power flow direction from the first circuit 24 as an input toward the second circuit 25 as an output. However, the converter 22 may also be operated to accommodate power flow in the reverse direction, and thus, is classified as a bi-directional converter. The converter 22 includes first and second terminating capacitor assemblies forming low pass filters 26 and 28 for isolating the high frequency link current pulses from circuits 24 and 25. The filters 26 and 28 are coupled in parallel to the respective circuits 24 and 25. The first filter 26 has three line to line $C_A$ capacitors 30, 32 and 34, while the second filter 28 has three line to line $C_B$ capacitors 35, 36 and 38.

A first switch assembly 40 has a three phase bank of thyristors $T_{A12}$, $T_{A21}$, $T_{A31}$, $T_{A12}$, $T_{A22}$ and $T_{A32}$ labeled 41, 42, 43, 44, 45 and 46, respectively. A second switch assembly 50 has a three phase bank of thyristors $T_{B12}$, $T_{B21}$, $T_{B31}$, $T_{B12}$, $T_{B22}$ and $T_{B32}$ labeled 51, 52, 53, 55, 55 and 56, respectively. Here, the first switch assembly 40 is also referred to as the input switch assembly, and the second assembly 50 as the output switch assembly. The input and output switch assemblies 40 and 50 do not require bi-directional switches, such as pairs of antiparallel thyristors or pairs of anti-series controllable turn off switches, as required in the earlier conventional series resonant converters. Advantageously, the thyristor construction of the switching assemblies 40 and 50 requires fewer thyristors than the earlier converters, so the converter 22 may be manufactured more economically than these earlier converters.

The converter 22 has a resonating circuit or resonance tank 60 coupled in series between the switch assemblies 40 and 50. The resonance tank 60 has an $L_R$ resonant inductor 62 and a $C_R$ resonant capacitor 64. A link current $i_R$ flows from the first switch assembly 40 to the second switch assembly through the resonance tank 60, and conductors 65 and 66, with a return path provided by conductor 68. The filters 26 and 28 substantially prevent any high frequency component of the link current $i_R$ from penetrating the input and output lines of the first and second circuits 24 and 25. The voltage at the output terminals of the first switch assembly 40, across conductors 65 and 68, is referred to as bus voltage $v_A$. The voltage at the input terminals of the second switch assembly 50, across conductors 66 and 68, is referred to as bus voltage $v_B$.

The converter 22 includes a link current synthesizer 70 for synthesizing the link current $i_R$ to be a train of unipolar current pulses (see FIG. 7), with each pulse including a controllable zero current segment and a controllable non zero current segment having a clamped portion, as described further below. For convenience, the illustrated synthesizer 70 is labeled with a plurality of nodes 72, 74, 75, 76 and 78. The synthesizer 70 is coupled across the $C_R$ resonant capacitor 64 and a blocking switch, such as a controllable $T_R$ resonance terminating switch or blocking thyristor 80. The $T_R$ blocking thyristor 80 couples the $C_R$ resonant capacitor 64 with conductor 66.

The link current synthesizer 70 has a $D_T$ terminating diode 82 coupled between the junction of the $C_R$ capacitor 64 with the $T_R$ thyristor 80, and node 78 of the synthesizer 70. The link current synthesizer 70 has a non-dissipative terminating device, such as an $L_T$ terminating inductor 84, which is in series with a $T_T$ terminating thyristor 86 between nodes 76 and 78. The synthesizer 70 has two controllable turn off switches, an $S_I$ initiating switch 88 coupled between nodes 72 and 76, and an $S_B$ buffer switch 90 coupled between nodes 72 and 74. Another non-dissipative device of synthesizer 70 is a link element $L_I$ initiating inductor 92, which is in series with a $D_B$ buffer diode 94 coupled between nodes 74 and 75. Node 75 is coupled to the junction of conductor 66 and the $T_R$ thyristor 80.

The converter 22 includes a non-dissipative $L_B$ link current clamping or buffering device, such as a current buffer inductor 95, coupled to nodes 72 and 75 of the synthesizer 70. An $i_B$ buffering current flows through the inductor 95, and is monitored by a buffer current sensor, such as an ammeter 96. While the buffer inductor 95 is illustrated as a device separate from the synthesizer 70, it is apparent that the synthesizer of the present invention may be constructed to include the buffer inductor 95. The converter 22 also has input and output sensor assemblies 97 and 98 for monitoring the voltage and current of the power flowing from the first circuit 24, and to the second circuit 25, respectively. The sensor assemblies 97 and 98 may be any type of conventional current and voltage sensors, such as ammeters and voltmeters, or their structural equivalents as known to those skilled in the art.

Except for the $S_I$ switch 88, all switches of the synthesizer 70 may have a current rating significantly less than the rating of the thyristors 41–46 and 51–56 of the input and output switch assemblies 40 and 50, which carry the bulk of the link current $i_R$. The synthesizer switches, other than the $S_I$ switch 88 carry current for only a small fraction of the duration of an entire cycle of a link current pulse, i.e., one fifth or less of a cycle.

Second Embodiment

Figure 2:
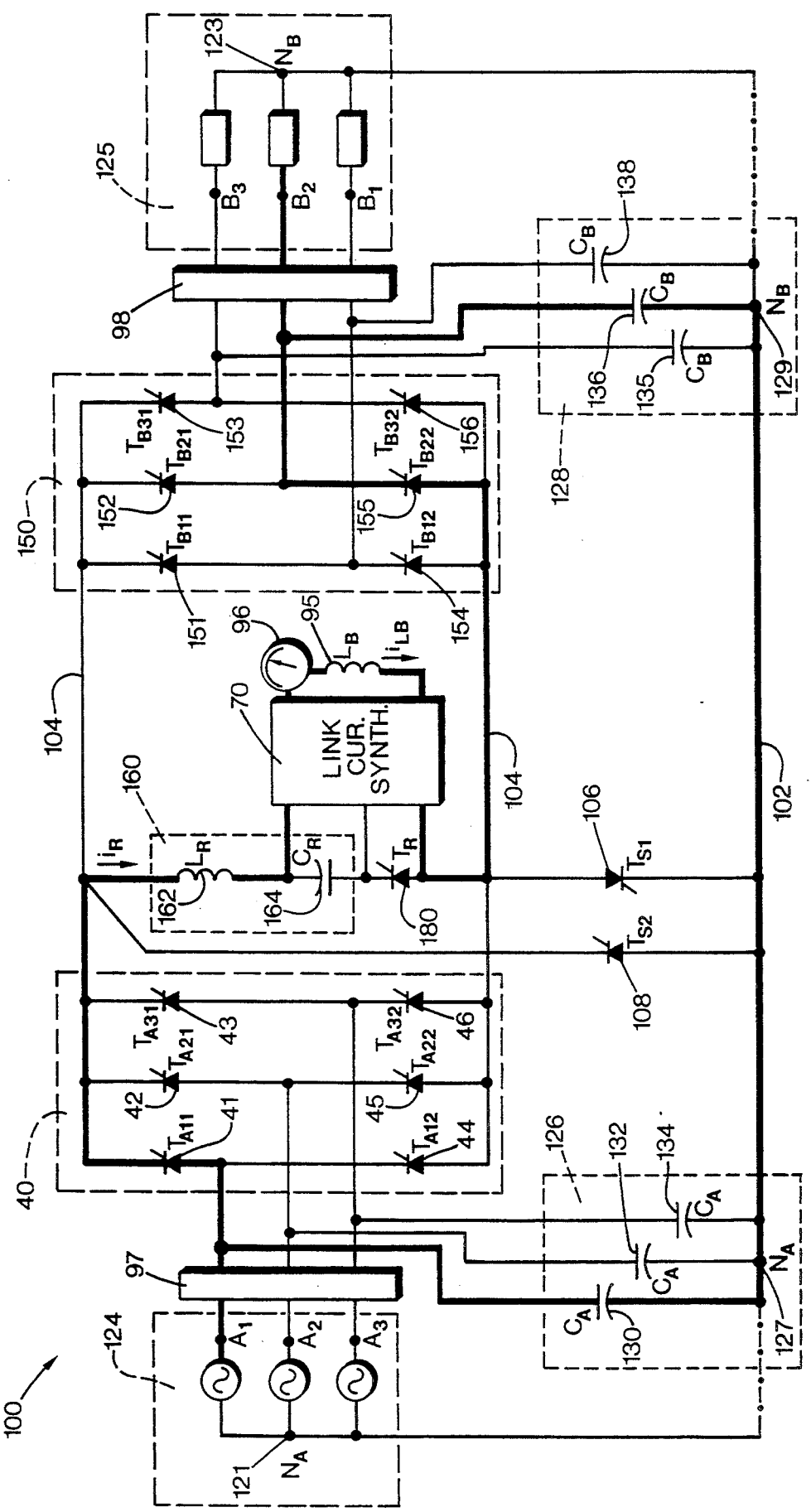
FIG. 2 is a schematic block diagram of one form of a unipolar cross type series resonant converter of the present invention illustrated in a three phase, four wire, AC to AC implementation with bi-directional, four quadrant operation.

FIG. 2 illustrates a cross type unipolar series resonant converter 100 constructed in accordance with the present invention is shown. The elements of the converter 100 which may be as described above for converter 22 have like numbers, and those with slight modification are increased by 100 from their counterparts in FIG. 1. For example, the converter 100 converts power between a wye power source 124 having an $N_A$ neutral 121 and a wye load 125 having an $N_B$ neutral 123. The converter 100 is capable of four quadrant operation, and of providing bi-directional power flow between circuits 124 and 125.

As a further example, the wye connected input filter 126 has an $N_A$ neutral tie 127 between capacitors 130, 132 and 134, in contrast with the delta capacitor arrangement in filter 26 of FIG. 1, and the output filter 128 is similarly constructed with an $N_B$ neutral tie 129. A conductor 102 couples the $N_A$ neutral 127 to the $N_B$ neutral 129. The dash-dot lines in FIG. 2 indicate that the $N_A$ neutrals 121 and 127 may be coupled together, and the $N_B$ neutrals 123 and 129 may be coupled together.

The cross type converter 100 has an output switch assembly 150 which differs from the assembly 50 of FIG. 1. Specifically, thyristors 151, 152, 153, 154, 155 and 156 have anode and cathode connections reversed from that of thyristors 51–56 of FIG. 1.

The cross type converter 100 has a resonant circuit 160 formed by the series connected $C_R$ resonant capacitor 162 and $L_R$ resonant inductor 164. The resonant circuit 160 is coupled between conductors 104 and 105 by a $T_R$ blocking thyristor 180. The resonant circuit 160 and $T_R$ blocking thyristor 180 are in parallel with both the input and output switch assemblies 40 and 50. The cross type converter 100 has a link current synthesizer 70 coupled to a buffer inductor 95, as described with respect to FIG. 1.

The cross type converter 100 may include two additional thyristors. A first $T_{S1}$ thyristor 106 has its anode coupled to conductor 104, and its cathode coupled to conductor 102, while a second $T_{S2}$ thyristor 108 has its anode coupled to conductor 102 and its cathode coupled to conductor 104. The $T_{S1}$ and $T_{S2}$ thyristors 106 and 108 may be used to short the resonant circuit 160 at either the source side or the load side of the converter 100.

Third Embodiment

The converter 22 in FIG. 1 is capable of accommodating bi-directional power flow and four quadrant operation. The converter 22 is not restricted to converter applications with performance specifications usually associated with conventional three phase converters, nor is it restricted to the circuit topology shown in FIG. 1. For example, first and second circuits 24 and 25 may be single phase, polyphase AC power or DC power.

Figure 3:
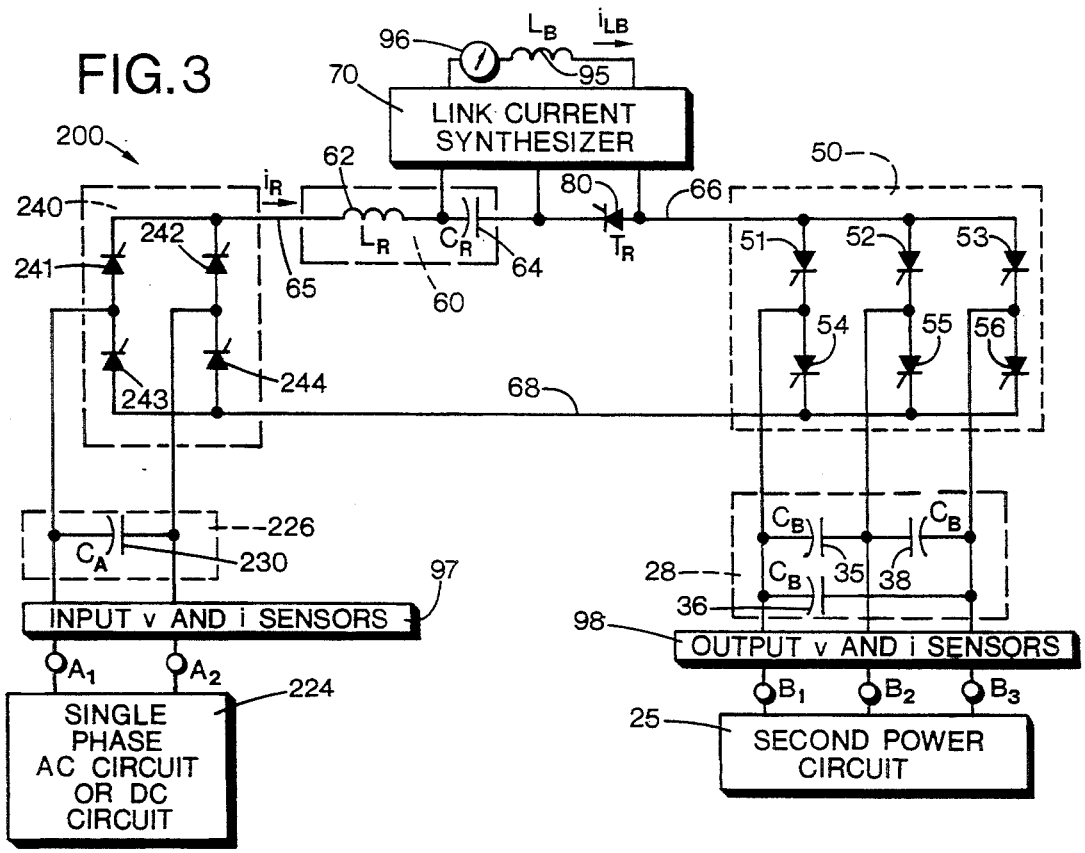
FIG. 3 is a schematic block diagram of one form of a unipolar series resonant converter of the present invention illustrated in a single phase DC or AC input and three phase AC output implementation with bi-directional, four quadrant operation.

FIG. 3 illustrates a third embodiment of a unipolar series resonant converter 200 constructed in accordance with the present invention. The elements of the converter 200 which may be as described above for converter 22 have like numbers, and those with slight modification are increased by 200 from their counterparts in FIG. 1. For example, the converter 200 converts power between a single phase AC or DC input power source 224, and second three phase power source 25, as described above with respect to FIG. 1. The converter 200 has a resonant circuit 60, $T_R$ blocking thyristor 80, and link current synthesizer 70 with buffer inductor 95, as described above.

The converter 200 has a thyristor bridge switching assembly 240 with four thyristors 241, 242, 243 and 244. The first filter 226 coupled to source 224 has only a single filtering $C_A$ capacitor 230. The converter 200 becomes a unidirectional DC to AC converter simply by removing the thyristor bridge 240 and coupling the $A_1$ and $A_2$ terminals to a DC power source (not shown).

Fourth Embodiment

Figure 4:
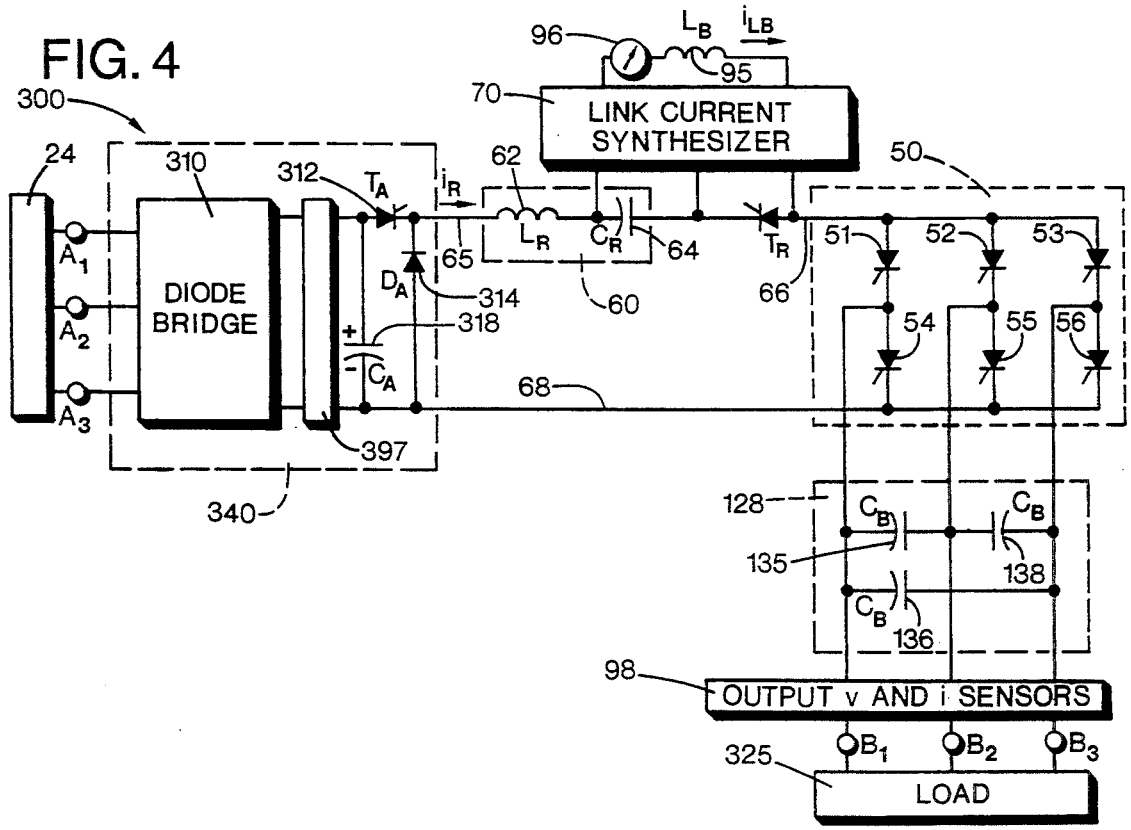
FIG. 4 is a schematic block diagram of one form of a unipolar series resonant converter of the present invention illustrated for three phase AC to AC operation with a diode bridge which may be removed for unidirectional DC to AC operation.

FIG. 4 illustrates a fourth embodiment of a unipolar series resonant converter 300 constructed in accordance with the present invention for unidirectional power flow. The elements of the converter 300 which may be as described above for converter 22 have like numbers, and those with slight modification are increased by 300 from their counterparts in FIG. 1. The converter 300 has replaced the thyristor bridge input switch assembly 40 of FIG. 1 with a less expensive diode switch assembly 340. The converter 300 is designed for power flow in a single direction, that is, unidirectional power flow, from the first circuit 24 to a second circuit or load 325. The diode switch assembly 340 may include a voltage sensor assembly 397, comprising conventional voltage sensors or their structural equivalents known to those skilled in the art, rather than the voltage and current sensor assembly 97 of FIGS. 1 and 2.

The diode switch assembly 340 includes a conventional diode bridge 310, in combination with a single $T_A$ series thyristor 312, and a $D_A$ free-wheeling diode 314. Note that a three phase capacitor filter, such as filter 26 in FIG. 1 or filter 126 in FIG. 2, is not required. Instead, a single filter element may be used if required, such as a $C_A$ terminating capacitor filter 318, which may be included as a portion of switch assembly 340. If the diode bridge 310 is eliminated, the first switching assembly comprises the $T_A$ thyristor 312 and $D_A$ diode 314, the $C_A$ filter capacitor 318 may be coupled directly across a DC circuit (not shown), and the converter becomes a DC to AC unipolar series resonant converter.

Alternate Link Current Synthesizer Embodiments

Figure 5:
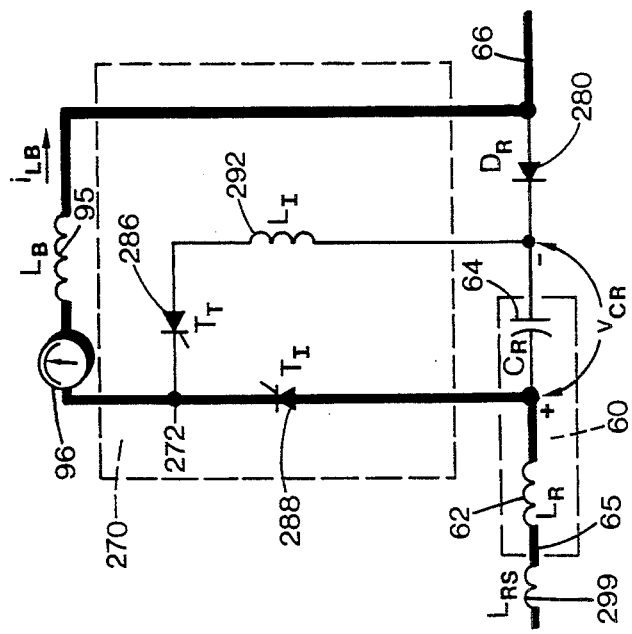
FIG. 5 is a schematic diagram of one form of an alternate link current synthesizer of the present invention.

Referring to FIG. 5, an alternate embodiment of a link current synthesizer 270 is shown which may be substituted for synthesizer 70 in the converters 22, 100, 200, and 300 of FIGS. 1-4, respectively. The alternate synthesizer 270 uses GATT thyristors, gate-assisted turn off thyristors (GATTs), with their short turn off times (10 μsec or less) and/or GTOs to provide a more simplified circuit than shown for synthesizer 70. The synthesizer 270 has a $D_R$ blocking diode 280 which replaces the $T_R$ thyristor 80 of FIG. 1. The synthesizer 270 has a single $L_I$ inductor 292 in series with a $T_T$ thyristor 286 to couple the junction of the $C_R$ capacitor 64 and the $D_R$ diode 280 with a node 272. A $T_I$ thyristor 188 replaces the $S_I$ switch 88 of FIG. 1, and couples the junction of the $L_R$ inductor 62 and the $C_R$ capacitor 64 with the node 272. The $T_T$ and $T_I$ thyristors 286 and 288 perform the same function as the $S_I$ switch 88 and the $T_T$ thyristor 86 of the link current synthesizer 70 shown in FIG. 1.

PRINCIPLES OF OPERATION

The principle of operation of the converters 22, 100, 200 and 300 will be illustrated by discussing the operation of converter 22 of FIG. 1, which also shows the details of the synthesizer 70. Assume the converter 22 has input terminals labeled A1, A2 and A3 coupled to the three phase AC source 24, and output terminals labeled B1, B2 and B3 coupled to a three phase load 25. The load 25 may be a passive load such as a resistor, inductor or capacitor, or a combination of thereof. Alternatively, the load 25 may be an electric machine which would subject the output terminals B1, B2 and B3 to voltages due to the back emf (electromagnetic force) characteristic of electric machines. It is apparent to those skilled in the art that the bi-directional embodiments of FIGS. 1-3, may have power flow from the output terminals B1, B2 and B3 to the input terminals A1, A2 and A3. Various control aspects of power transfer from the source to the load are illustrated below.

For example, a closed current path is shown in heavy black lines in FIG. 1 when energy is exchanged between the source 24 and the load 25. The current in this closed current path flows through thyristors $T_{A11}$ and $T_{A32}$ of the input switch assembly 40, and through thyristors $T_{B31}$ and $T_{B32}$ of the output switch assembly 50.

The $L_B$ buffer inductor 95 is also part of this current path, and serves the same function as a buffer capacitor in a conventional DC link converter.

A. Generation of the Link Current Pulses: USGL Controller

Figure 6:
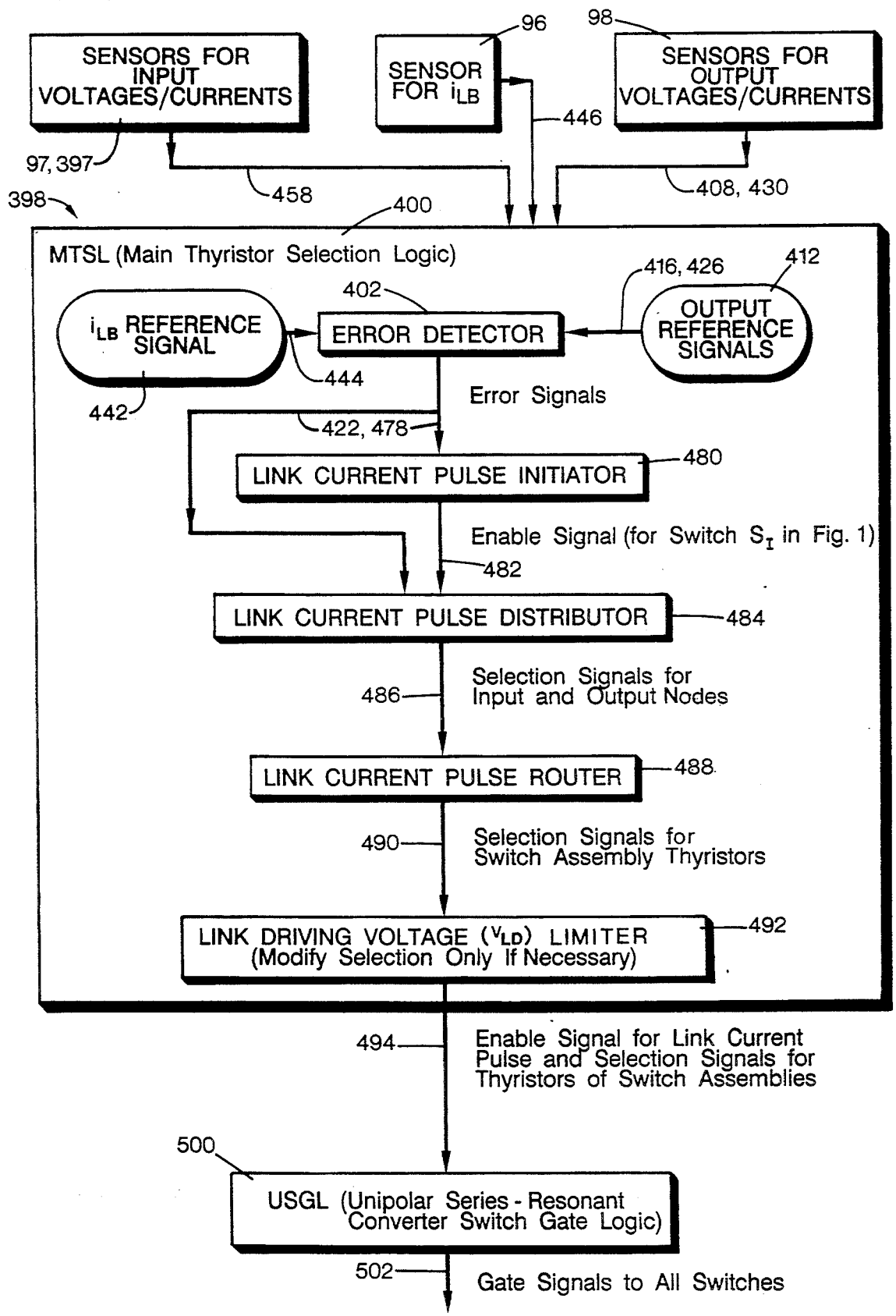
FIG. 6 is a block diagram of one form of a controller for the unipolar series resonant converter of the present invention.
Figure 7:
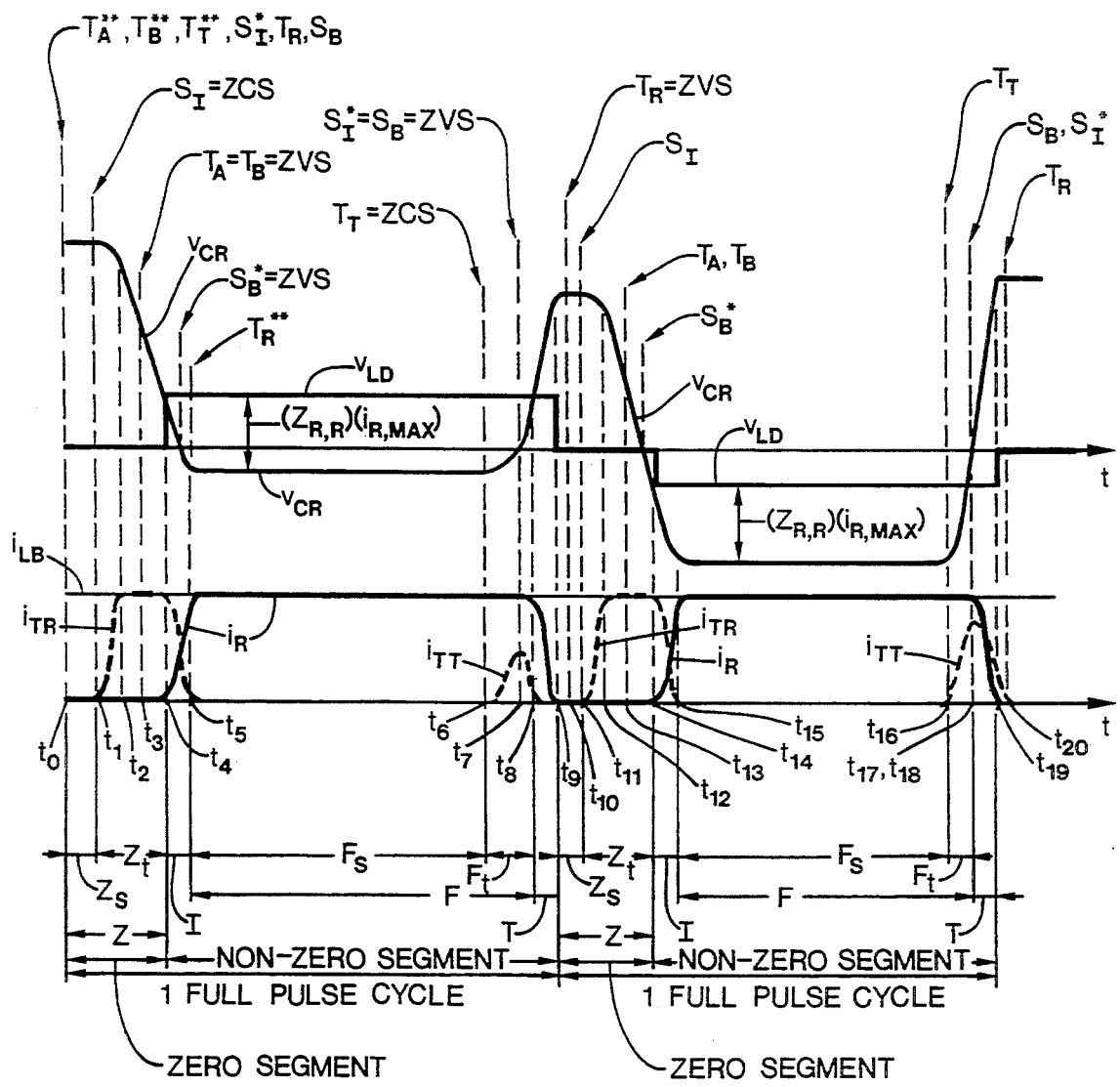
FIG. 7 is a series of graphs showing waveforms associated with the converter illustrated in FIGS. 1-4, including the gate signal timing logic for the converter switches, and showing Z-mode, I-mode, F-mode and T-mode converter operational states.

Referring to FIG. 7, the converters 22, 100, 200 and 300 each may have a controller 398 comprising first and second subcontroller stages. The first stage of the controller 398 comprises a main thyristor selection logic ("MTSL") controller 400, and the second stage comprises a unipolar series resonant converter switch gate logic ("USGL") controller 500. FIG. 6 illustrates the structure, general principles of operation of the MTSL controller 400 and will be described in detail below after illustrating the operation of the converter subject to a switching schedule determined by the USGL controller 500.

The USGL controller 500 provides gate signals, collectively, signals 502, to all of the converter switches ($T_A$ and $T_B$ thyristors 41-46, 51-56, and 241-244 of the input and output switch assemblies 40, 50, and 240; the $T_R$ and $T_T$ thyristors 80 and 86; and the $S_I$ and $S_B$ switches 88 and 90) according to the timing logic shown in FIG. 7, except for the turn off of the thyristors which turnoff by natural commutation. The timing of these switching signals is also described above with reference to FIGS. 8-16. The USGL controller 500 may be implemented with commercially available analog and/or digital logic components or their structural equivalents known to those skilled in the art.

The USGL controller 500 provides the gate signals 502 to all of the converter switches if the following decisions have been made regarding:

1. Timing for initiating the link current pulse $i_R$ by turning on the $S_I$ switch 88; and
2. Selection of which of the $T_A$ and $T_B$ thyristors of the input and output switch assemblies 40, 50, 240 which determines the current path for the link current $i_R$.

Referring also to FIG. 7, the process of generating link current pulses is illustrated. The link current $i_R$ is defined as the current flowing through the $L_R$ resonant inductor 62. The preferred link current $i_R$ comprises a train of unipolar pulses, with each pulse having a zero current segment and a non zero current segment. Preferably, both of zero and nonzero current segments are controllable in duration while assuring minimal switching losses either through zero current switching and/or zero voltage switching.

Preferably, the link current pulses are generated in a stable fashion under regular, as well as irregular, source and load operating conditions. Stability here means that the energy stored in the link elements is prevented from building up or collapsing as successive link current pulses flow through these link elements (i.e., the resonance circuit 60, the $L_T$ and $L_I$ inductors of synthesizer 70, and the $L_B$ buffer inductor 95). In particular, the voltage across the $C_R$ resonant capacitor 64 is a measure of this stored energy, and thus preferably does not become excessive or collapse at the completion of each pulse cycle.

For a given implementation, the period of the link current pulses may be significantly smaller than the period of the voltage and current waveforms at the input and output of the converter 22. Therefore, assume that during the period of an entire pulse cycle:

1. the line to line voltages at the source 24 and the load 25 are constant because the $C_A$ and $C_B$ filter capacitors 30-38 are relatively large compared to the $C_R$ resonant capacitor 64; and
2. the current $i_{LB}$ in the $L_B$ buffer inductor 95 is constant because inductor 95 is relatively large compared to the $L_R$ resonant inductor 62.

These assumptions are not requirements for proper operation of converter 22, but are introduced merely to explain the principles of the invention in an expedient manner without clouding the description with rigorous details apparent to those skilled in the art.

The link current $i_R$ is driven by a link driving voltage $v_{LD}$. The link driving voltage $v_{LD}$ is non zero only when selected thyristors of the switch assemblies 40 and 50 are turned on to permit the link current $i_R$ to flow. The link driving voltage $v_{LD}$ is determined by:

1. the line to line voltages at the source 24 and the load 25, and
2. the thyristors of the input and output switch assemblies 40 and 50 which are selected to carry the link current $i_R$.

Upon firing thyristors 41-46 and 51-56, the driving voltage $v_{LD}$ for the link current $i_R$ is the voltage difference:

$$v_{LD} = v_A - v_B$$

Now, consider the link current $i_R$ flowing in the path indicated with the heavy black lines through the $T_{A11}$, $T_{A32}$, $T_{B31}$ and $T_{B12}$ thyristors 41, 46, 53 and 54 in FIG. 1. Since the thyristors of the input and output switch assemblies are selected to carry the link current $i_R$, the input bus voltage $v_A$ and output bus voltage $v_B$ are:

$$v_A = v_{A1} - v_{A3}$$

$$v_B = v_{B3} - v_{B1}$$

where $(v_{A1} - v_{A3})$ and $(v_{B1} - v_{B3})$ are indeed the line to line voltages at the source 24 and the load 25, respectively.

Even though the link driving voltage $v_{LD}$ varies from pulse to pulse, assuming positive and negative values, its maximum value is bounded because the line to line voltages of both source 24 and load 25 are bounded. The source 24 and load 25 line to line voltages are bounded either because:

1. the converter is impressed with a certain voltage pattern, or
2. control of the thyristors in the switch assemblies 40, 50 follow the pattern of a certain set of reference signals, discussed below.

Since the voltages $v_A$ and $v_B$ are assumed (not required) to be constant, the link driving voltage $v_{LD}$ may also be assumed constant during the non zero current segment of the link current pulse.

FIG. 7 shows two full cycles of waveforms of selected quantities during operation of the converter 22 shown in FIG. 1, as well as the timing logic for the gate signals of the various switches used. The link driving voltage $v_{LD}$ is positive for the first pulse, and negative for the second pulse. Each full cycle of the link current pulses $i_R$ has four basic modes of operation referred to as:

1. Z-mode for a zero current segment Z during which the link current $i_R$ is zero.
2. I-mode for an initiating current segment I during which the link current pulse is initiated through resonant oscillation.
3. F-mode for a flat non-zero current segment F during which the link current pulse is clamped by the buffer inductor current $i_{LB}$ through the $L_B$ buffer inductor 95 while the resonant circuit oscillation is inactive.
4. T-mode for a terminating current segment T during which the link current pulse is returned to zero by resonant oscillation.

In FIG. 7, the waveform of the link current pulses $i_R$ reflects these four modes of operation. The non-zero current segment comprises the I segment, the F segment and the T segment. Both the durations of the zero current segment Z and the nonzero current segment (I+F+T) are independently controllable in duration.

FIG. 7 also shows the schedule for turning each switch of converter 22 on and off to illustrate the gate signal timing logic for each switch. The switching times are indicated in FIG. 7 by an arrow adjacent to each switch name. Single superscript asterisks indicate when a switch has received a control signal to turned off, rather than turn on. Thyristor turn off occurs by natural commutation as the current returns to zero through each of the thyristors, as indicated by double superscript asterisks in FIG. 7. All switching occurs at substantially zero switch current, defined as "zero current switching" (ZCS) or at substantially zero switch voltage, defined as "zero voltage switching" (ZVS), as shown in FIG. 7.

FIG. 7 shows the currents flowing through the thyristors, i.e. the $T_R$ thyristor 80 carries a current $i_{TR}$, the $T_T$ thyristor 86 carries a current $i_{TT}$, and the thyristors of both the input and output switch assemblies 40 and 50 carry the link current $i_R$. The particular $T_A$ and $T_B$ thyristors of switch assemblies 40 and 50 conducting at a given time depends upon the particular control strategy used to transfer power from the source 24 to the load 25, discussed further below.

B. Z-mode Operation

The Z-mode of operation is divided into a steady $Z_S$-mode shown in FIG. 8, and a transitional $Z_t$-mode shown in FIG. 9. The steady $Z_S$-mode occurs when the link current $i_R$ flowing during the previous pulse has returned to zero, and none of the $T_A$ or $T_B$ thyristors switch assemblies 40 or 50 are conducting. In the transitional $Z_t$-mode, action is undertaken to prepare for the initiation of the nonzero current segment. The status of all switches during the $Z_S$-mode is shown in FIG. 7 at time $t_o$: the $T_A$, $T_B$, $T_T$ thyristors and the $S_I$ switch have not been fired (indicated by the superscript asterisk), but the $S_B$ switch and the $T_R$ thyristor have been turned on.

Referring to FIG. 8, during the $Z_S$-mode, the $S_I$ switch 88 is open, the current $i_{LB}$ through the $L_B$ buffer inductor 95 is "free-wheeling" through the $L_I$ inductor 92, the $D_B$ diode 94 and the $S_B$ switch 90. Under these conditions, the $C_R$ resonant capacitor 64 carries no current, leaving a constant and positive $v_{CR}$ voltage across the $C_R$ capacitor 64. By selecting certain values for $L_R$, $L_I$ and $C_R$, the $v_{CR}$ voltage may be higher than the maximum value of the link driving voltage $v_{LD}$.

Referring to FIG. 9, the $Z_t$-mode begins at time $t_1$ by turning on the $S_I$ initiating switch 88. Selecting time $t_1$ controls the duration of the zero current segment Z. As the $S_I$ switch 88 is turned on at $t_1$, the positive resonant capacitor voltage $v_{CR}$ is reduced because resonant oscillation of the $C_R$ and $L_I$ resonant circuit causes current $i_{TR}$ to begin to flow through the $T_R$ thyristor 80. The current $i_{TR}$ increases at instant $t_1$ because the current $i_{DB}$ through the $D_B$ diode 94 and the $L_I$ inductor 92 decreases while the current $i_{LB}$ through the relatively large $L_B$ buffer inductor 95 is practically constant. Thus, at instant $t_1$, the behavior of the current $i_{DB}$, the current $i_{TR}$ and the resonant capacitor voltage $v_{CR}$ is subject to resonant oscillation of the circuit formed by $C_R$ and $L_I$ and hence, this behavior follows a pattern given by:

$$i_{DB} = i_{LB} - v_{CR}(Z_S)\sin[\omega_{I,R}(t-t_1)]/Z_{I,R}$$

$$i_{TR} = i_{LB} - i_{DB}$$

$$v_{CR} = v_{CR}(Z_S)\cos[\omega_{I,R}(t-t_1)]$$

where:
$\omega_{I,R} = (L_I C_R)^{-\frac{1}{2}}$
$Z_{I,R} = (L_I/C_R)^{+\frac{1}{2}}$
$v_{CR}(Z_S)$ = resonant capacitor voltage during the $Z_S$-mode.

It is apparent that the converter 22 may be designed so the current $i_{DB}$ returns to zero before the resonant capacitor voltage $v_{CR}$ becomes less than the maximum link driving voltage $v_{LD,max}$ to which the link elements may be subjected. If desired, this condition may be derived from these relationships as a design constraint based upon the characteristic impedance $Z_{I,R}$ according to:

$$Z_{R,I} < [v_{CR,min}(Z_S)\sin(\alpha)]/i_{LB}$$

with:
$\alpha = \arccos[v_{LD,max}/v_{CR,min}(Z_S)]$

Thus, at time $t_1$ the current $i_{TR}$ through the $T_R$ thyristor 80 increases as the current $i_{DB}$ through the $D_B$ diode 94 decreases.

At time $t_2$, the current $i_{DB}$ returns to zero and the current $i_{TR}$ is clamped to the value of the buffer current $i_{LB}$. At time $t_2$ the voltage $v_{CR}$ is still positive, so the $D_B$ diode 94 is back biased and the $S_B$ switch 90 may be turned off under ideal conditions, i.e. at zero current (ZCS) and at zero voltage (ZVS). Moreover, turning on the selected thyristors $T_A$ and $T_B$ of switch assemblies 40, 50 at time $t_3$ will not cause these thyristors to conduct because the link current $i_R$ is prevented from flowing until the voltage $v_{CR}$ becomes less than the link driving voltage $v_{LD}$.

C. I-mode Operation

Referring to FIGS. 7 and 11, at time $t_4$, the link current $i_R$ begins to flow through the $T_A$ and $T_B$ thyristors when the voltages across these thyristors are substantially zero (ZVS). This advantageous zero voltage switching of the input and output switch assemblies stems from the controlled decrease of resonant capacitor voltage $v_{CR}$, a feature which is not possible with conventional series resonant converters using AC link current pulses.

After time $t_4$, the link current $i_R$ increases and the voltage $v_{CR}$ decreases, which is defined as the initiation of I-mode. During the I-mode, as shown in FIG. 11, resonant oscillation occurs due to the $C_R$ and $L_R$ resonant circuit 60, and the converter behavior may be described by the following equations:

$$L_R(di_R/dt) = v_{LD} - v_{CR}$$

$$C_R(dv_{CR}/dt) = -i_{TR}$$

with: $i_{TR} = i_{LB} - i_R$

As the current $i_R$ increases, the $i_{TR}$ thyristor current decreases (third equation above) until reaching zero, and remains at zero until the end of I-mode operation, that is, at time $t_5$.

D. F-mode Operation

Referring again to FIG. 7, at time $t_5$, the $T_R$ thyristor 80 turns off by natural commutation as the thyristor current $i_{TR}$ returns to zero. Also at time $t_5$, the link current $i_R$ is clamped to the value of the buffer current $i_{LB}$ to begin the F-mode of operation. Similar to the Z-mode, the F-mode comprises two consecutive modes of operation: the $F_S$ steady mode, shown in FIG. 12, and the $F_t$ transitional mode, shown in FIGS. 13-15.

Referring to FIG. 12, the $F_S$ steady mode begins at time $t_5$ when the link current pulse $i_R$ is clamped to the buffer inductor current $i_{LB}$. Also at time $t_5$, the voltage $v_{CR}$ stops decreasing and maintains a constant value during the entire $F_S$ steady mode. The constant value of $v_{CR}$ is maintained because the current $i_{TR}$ returned to zero at the instant $t_5$. The value of the resonant capacitor voltage $v_{RC}$ during the $F_S$-mode is given by:

$$v_{CR}(F_S) = v_{LD} - Z_{R,R} i_{R,max}$$

where:
$Z_{R,R} = (L_R/C_R)^{+\frac{1}{2}}$
$i_{R,max}$ = maximum link current which is clamped to $i_{LB}$.
$Z_{R,R}$ is the characteristic impedance of the $L_R$ and $C_R$ resonant circuit 60 which causes the link current $i_R$ to increase through resonant oscillation during the I-mode.

During the $F_S$-mode, the resonant capacitor voltage $v_{CR}$ should be non-positive, allowing the link current $i_R$ to reach zero for zero voltage switching during the upcoming T-mode. The expression above for $v_{CR}(F_S)$ shows that this condition may be assured by choosing $Z_{R,R}$ so:

$$Z_{R,R} > v_{LD,max}/i_{LB}$$

where $i_{R,max}$ equals $i_{LB}$ because $i_R$ is clamped to the buffer current $i_{LB}$ during the $F_S$ steady mode.

Three items need comment at this point. First, as the resonant capacitor voltage $v_{CR}$ decreases from a positive value beginning at time $t_0$, it reaches a minimum value at time $t_5$, the beginning of the $F_S$-mode. During the entire $F_S$-mode, the $v_{CR}$ voltage is maintained at this minimum value until the end of the $F_S$-mode at time $t_6$. The expression given earlier for $v_{CR}(F_S)$ is the minimum value of the resonant capacitor voltage $v_{CR}$ during a full pulse cycle, and is bounded because:

1. The maximum link current is bounded by the buffer inductor current $i_{LB}$; and
2. The link driving voltage $v_{LD}$ is bounded to the maximum input or output line to line voltage because the line to line voltages of both source 24 and load 25 are bounded.

As a second comment, resonant oscillation of the resonant circuit 60 is deactivated at time $t_5$ because the link current $i_R$ is clamped to the buffer current $i_{LB}$ and the resonant capacitor voltage $v_{CR}$ is constant. Deactivation of resonant oscillation through circuit 60 is caused by turn off of the $T_R$ thyristor 80. When the link current $i_R$ flows through converter 22 (heavy black lines in FIGS. 1 and 11), power from the source 24 to the load 25 takes place while the resonant oscillation of the resonant circuit 60 is inactive, which is a feature not available in earlier converters. During this power flow, most elements of the link current synthesizer 70 do not carry current. Indeed, only the $S_I$ initiating switch must be rated for full load current, which provides a significant cost saving.

As a third comment, the $F_I$-mode may begin at any instant, so the duration of the F-mode and therefore, the duration of the nonzero current segment, is controllable.

At time $t_6$, the $F_I$-mode begins. To stop flow of the link current $i_R$, the resonant circuit 60 is reactivated. The link current $i_R$ is diverted to flow through the $C_R$ resonant capacitor 64, the $D_T$ diode 82, and the $S_B$ switch 90.

Referring to FIG. 13, during the first step of this diversion process, the $T_T$ thyristor 86 is fired at any desired time $t_6$. Firing the $T_T$ thyristor 86 activates a $C_R$ and $L_T$ resonant circuit. The $C_R$ and $L_T$ resonant oscillation drives the negative resonant capacitor voltage $v_{CR}$ up to reach zero at time $t_7$, for initiation of the second step of this diversion process (FIGS. 14–15), that is, zero voltage switching of the $S_B$ switch 90 followed subsequently by turning off of the $S_I$ switch 88 (indicated by the asterisk in FIG. 7). Both switchings occur at zero voltage (ZVS).

Between times $t_6$ and $t_7$, the resonant oscillation of the $L_T$ and $C_R$ resonant circuit is completely unaffected by currents or voltages in other parts of the converter 22. Isolation of the $L_T$ and $C_R$ resonant circuit is achieved by the $T_R$ blocking thyristor 80 and the $S_B$ blocking switch 90. Hence, resonant oscillation during the interval between times $t_6$ and $t_7$ satisfies the following equations:

$$v_{CR} = L_T(di_{TT}/dt)$$

$$C_R(dv_{CR}/dt) = i_{CR} = i_{TT}$$

Consequently, the maximum value of the current through the $L_t$ inductor 84 is given by:

$$i_{TT,max} = v_{CR,max}(F_S)/Z_{T,R}$$

$$Z_{T,R} = (L_T/C_R)^{+\frac{1}{2}}$$

where $Z_{T,R}$ is the characteristic impedance of the $L_T$ and $C_R$ resonant circuit.

In preventing currents through any of the link element inductors and switches from exceeding the buffer current $i_{LB}$ and the $Z_{T,R}$ characteristic impedance should satisfy the relationship:

$$Z_{T,R} > v_{CR,max}(F_S)/i_{LB}$$

By substituting the expression for $v_{CR}(F_S)$ as given earlier, this relationship yields the following relationship between $Z_{T,R}$ and $Z_{R,R}$:

$$Z_{T,R} > Z_{R,R} + v_{LD,max}/i_{LB}$$

To provide sufficient time for the $S_B$ switch 90 to close before the $S_I$ switch 88 is opened (on the order of one microsecond for today's commercial IGBTs), the rate of change of $v_{CR}$ may be adjusted by selecting a high inductance for the $L_T$ inductor 84. The time interval between $t_6$ and $t_7$ may be derived from the resonant oscillation equations above, to provide an exact formula for this time interval:

$$T(t_6, t_7) = [\pi(L_T C_R)^{+\frac{1}{2}}]/2$$

At time $t_7$, the $S_B$ switch 90 is closed, and the resonant capacitor voltage $v_{CR}$ is zero and remains at zero until the $S_I$ switch 88 is opened. Referring to FIG. 14, between activation of the $S_B$ and $S_I$ switches, the $v_{CR}$ voltage remains at zero because current flows through the short circuit path of the $L_T$ inductor 84, the $S_I$ switch 88 and the antiparallel diode of the $S_B$ switch 90. Between activation of the $S_B$ and $S_I$ switches, the $S_I$ switch 88 carries both the link current $i_R$ and the $L_T$ inductor current $i_{TT}$ until switch $S_I$ is firmly opened.

Thus, the $S_I$ switch 88 is rated for a peak current equal to the sum of maximum link current $i_R$ and the maximum $L_T$ inductor current $i_{TT}$. However, the average current is negligibly higher than that of the average value of the link current $i_R$ because current $i_{TT}$ is only carried by the switch $S_I$ for a short duration, on the order of one microsecond for commercially available power switches. Therefore, the time that the $S_I$ switch 88 carries the additional current $i_{TT}$ is extremely short compared to the link current cycle period, which is on the order of 60 μsec for a converter designed for operation at a modulation frequency of 20 Khz.

Even though most commercially available power switches are quite capable of withstanding such an increase in the peak current without the need for any over rating, a number of approaches are possible to avoid any problems. For example, the $S_I$ switch 88 may be replaced by two parallel switches (not shown), with one dedicated to carry the additional current $i_{TT}$ between activation of the $S_B$ and $S_I$ switches. This dedicated switch may be turned on between times $t_6$ and $t_7$, and turned off at time $t_7$. The average current rating of such a dedicated switch is extremely small, and both turn off and turn on would be at zero voltage if conduction begins at time $t_1$.

As shown in FIG. 15, following the opening of switch $S_I$ at time $t_7$, the link current $i_R$ is diverted to flow through the $C_R$ resonant capacitor 64. Both the resonant capacitor voltage $v_{CR}$ and the link current $i_R$ are subjected to resonant oscillations from two resonant circuits: the $C_R$ and $L_T$ resonant circuit activated by the $T_T$ thyristor 86, and the $C_R$, $L_R$ and $L_I$ resonant circuit. After time $t_7$, the resonant capacitor current $i_{CR}$ follows from:

$$i_{CR} = i_R + i_{TT}$$

Both the currents $i_R$ and $i_{TT}$, and therefore the current $i_{CR}$, can only assume positive values because they are both carried by unidirectional thyristors, that is, the input and output thyristors $T_A$, $T_B$, and the $T_T$ thyristor 86. As a result, the resonant capacitor voltage $v_{CR}$ increases even further. As voltage $v_{CR}$ becomes higher than the link driving voltage $v_{LD}$, the link current $i_R$ decreases due to the effect of the $C_R$, $L_R$ and $L_I$ resonant circuit, as described by:

$$(L_R + L_I)(di_R/dt) = v_{LD} - v_{CR}$$

E. T-mode Operation

Referring to FIG. 7, at time $t_8$, the T-mode begins as the resonant capacitor voltage $v_{CR}$ exceeds the link driving voltage $v_{LD}$ causing the link current $i_R$ to begin its decay. As shown in FIG. 16, the T-mode ends at time $t_9$ when the link current $i_R$ reaches zero. At time $t_9$, the $T_A$ and $T_B$ thyristors of the input and output switch assemblies 40 and 50 are turned off by natural commutation. During the T-mode, as the link current gradually returns to zero through resonant oscillation of the resonant circuit formed by the $L_T$ inductor 84 and $C_R$ resonant capacitor 64, as shown by the heavy lines in FIG. 15. The current $i_{TT}$ also returns to zero during oscillation of the $C_R$ and $L_T$ resonant circuit. The buffer inductor current $i_{LB}$ is gradually picked up to free-wheel through the $S_B$ switch 90 and the $D_B$ diode 94.

At time $t_{10}$, the resonant capacitor voltage $v_{CR}$ stops increasing and maintains a constant positive value. At time $t_{10}$ the T-mode has ended, the pulse cycle has been completed, and a new pulse cycle has begun with a new $Z_S$-mode of operation. The entire process for generating a new link current pulse is repeatable to establish a train of unipolar link current pulses.

F. Operation of the Alternate GATT or GTO Link Current Synthesizer

The USGL controller 500 may be modified as known by those skilled in the art to operate the GATT or GTO embodiment of synthesizer 270 shown in FIG. 5. The $T_T$ and $T_I$ thyristors 286, 288, whether GATTs or GTOs, operate as described above for the $T_T$ thyristor 86 and the $S_I$ switch 88 of synthesizer 70.

The $T_I$ thyristor 288 turns on at the same time as the $S_I$ switch 88, for example at $t_1$ and $t_{11}$ in FIG. 7. The $T_I$ thyristor 288 turns off by natural commutation as the current flowing through it goes to zero. For example, a GATT $T_I$ thyristor 288 turns off at $t_9$. If a GTO is used, then the USGL controller 500 issues the GTO $T_I$ thyristor 288 a turn off signal at $t_7$.

The $T_T$ thyristor 286, whether a GATT or a GTO, turns on and off as described above for the $T_T$ thyristor 86 and as shown in FIG. 7. The $D_R$ blocking diode 280 conducts as a normal diode according to the voltage biasing diode 280. During the free-wheeling modes during the time intervals $t_0$–$t_1$ and $t_9$–$t_{10}$ flows through the loop created by the $L_B$ buffer inductor 95, the $D_R$ diode 280, the $L_I$ inductor 292, and the $T_T$ thyristor 286.

G. Unipolar Link Current Pulses

The constant and positive value of the resonant capacitor voltage $v_{CR}$ during the $Z_S$-mode of each pulse is given by:

$$v_{CR}(Z_S) = |v_{LD}| + K Z_{RI,R} i_{R,max}$$

where:

$Z_{RI,R} = [(L_R + L_I)/C_R]^{\frac{1}{2}}$ $i_{R,max}$ = maximum link current which is clamped to $i_{LB}$ $|v_{LD}|$ = absolute value of $v_{LD}$ $0 < K < 1$ $Z_{RI,R}$ is the characteristic impedance of the $L_R$, $L_I$ and $C_R$ resonant circuit which causes the link current to return to zero during the T-mode. The factor K is always positive, has a maximum value of unity and is otherwise a function of the link driving voltage $v_{LD}$ and the value of the resonant capacitor voltage $v_{CR}$ during the $F_S$-mode. K attains a minimum value if $v_{LD}$ is zero.

Therefore, to assure that the resonant capacitor voltage $v_{CR}$ during the $Z_S$-mode is higher than the maximum value of the link driving voltage $v_{LD}$. A cumbersome analysis verified by experiments reveals that it is necessary to choose $Z_{RI,R}$ to be about 1.3 to 1.8 times the value chosen for $Z_{R,R}$. The requirement for the choice of $Z_{R,R}$ was given earlier.

The T-mode leaves a firm back bias voltage during the entire Z-mode at all switches which carry the link current $i_R$ during other modes. The total back bias voltage available equals ($v_{CR} - v_{LD}$) and can be designed to any desired value by the choice of $Z_{RI,R}$.

Although the $T_R$ thyristor 80 may be fired along with turning on of the $S_I$ switch 88 to initiate the $Z_S$-mode, it is preferable to fire $T_R$ immediately after the T-mode is completed, i.e. when the link current $i_R$ has returned to zero at time $t_{10}$. This operation facilitates zero voltage switching of $T_R$ because the voltage across $T_R$ is approximately zero as $T_R$ starts to conduct when the switch $S_I$ is turned on. Moreover, the total back bias voltage is shared exclusively by the thyristors of the input and output switch assemblies 40 and 50.

Finally, it is noted that the non-dissipative elements of the link current synthesizer 70 carry low rms (root mean square) currents and consequently, incur low losses. This benefit occurs because there is no resonant oscillation of these link elements during the F-mode. Transfer of power from the source 24 to the load 25, or vice versa, during the F-mode is accomplished by current flow through the $L_B$ buffer inductor 95 and the $S_I$ switch 88. During the F-mode, the $L_B$ inductor 95 carries only DC current, so the $L_B$ inductor is not subjected to AC-induced skin-effect losses, such as those incurred in the earlier converters which generate link current pulses entirely through resonant (AC) oscillation.

H. Stability of Link Current Pulses

A prerequisite to proper performance of the converter is stability of the link current pulses which transfer power from the source 24 to the load 25 or vice versa. As discussed above, the resonant capacitor voltage $v_{CR}$ attains both positive and negative maximum values which are bounded for each full pulse cycle. Since the maximum current in any of the inductors of the link elements does not exceed the buffer inductor current $i_{LB}$, energy build up and collapse are prevented within the link elements of the converter. Thus, power transfer through the converter 22 by generation of the train of unipolar link current pulses, such as shown in FIG. 7, is conducted in a stable manner.

I. Peak Value of the Link Current Pulses

It is apparent that the peak value of the link current pulses are limited in amplitude by the buffer inductor $L_B$. The inductance value of the $L_B$ inductor 95 is relatively high to assure the current behaves constantly for a duration which is longer than the intended duration of a full pulse cycle of the link current. The $i_{LB}$ current through the $L_B$ inductor 95 is controlled by selecting the capacity of the $T_A$ and $T_B$ thyristors of the input and output switch assemblies 40, 50 to carry the link current. During the F-mode the link current $i_R$ is clamped to the current amplitude $i_{LB}$ flowing through the buffer inductor $L_B$. This clamping action of the $L_B$ inductor 95 imparts near square wave shaped waveform to the link current pulses $i_R$, rather than a sinusoidal waveform as in the earlier series resonant converters.

For adequate power transfer at full load operating conditions, the converter 22 may be designed so the average value of the link current pulses $i_R$ over a full pulse cycle is at least equal to the maximum load current required for full load operation. For example, if converter 22 is designed for equally rated input and output voltages with a maximum full load current of $i_{o,max}$, then converter 22 may be designed to accommodate an average link current $i_{R,ave}$ which is at least equal to maximum full load current of $i_{o,max}$. Thus, $$i_{R,ave} = i_{o,max}$$

Since the link current pulses $i_R$ are near-squarewaves, the link current pulse peak value $i_{R,peak}$ for which the converter 22 is rated is given by:

$$i_{R,peak} = i_{R,ave}/D = i_{o,max}/D$$

where D is the duty cycle of the pulse given by the ratio of the durations of the nonzero current segment (I, F, and T-modes) to the full pulse cycle.

Commercially available, inverter grade thyristors having a blocking voltage rating of 1200 V may be used for the input and output switch assemblies 40, 50 of a converter 22 having a 480 V line-to-line voltage rating. Such thyristors provide a turn off time corresponding to a zero segment duration of about 14 μsec. Thus, a converter 22 constructed in accordance with the present invention may have a modulation frequency of 16 kHz for a duty cycle D of about 0.77. From the relationship given above, the link current peak value $i_{R,peak}$ is about 1.3 times maximum current for full load operation.

For the earlier converters, this factor is on the order of 3 to 9, which is far higher than the value of 1.3 for converter 22. Thus, the current carrying components of the earlier converters must have much higher current ratings, which increases their expense, both in terms of initial component costs and operating costs due to the $I^2R$ heating losses.

The earlier series resonant converters generate near-sinusoidal link current pulses so the entire nonzero current segment of the pulses is synthesized through resonant oscillation. This causes the relationship between peak value and average value of the link current, and therefore the maximum full load current, in the earlier converters, to be dictated by:

$$i_{R,peak} = (\pi/2)(i_{R,ave}) = (\pi/2D)[i_{o,max}]$$

Consequently, even for the same duty cycle D, the required link current peak value of the earlier converters is greater than the link current peak value of converter 22 by a factor of $\pi/2$. If practical design aspects are considered, this factor is higher than $\pi/2$ because the duration of the zero current segment must be increased, which results in a decrease of the duty cycle D. This duty cycle decrease in the earlier converters may be avoided only if the modulation frequency is sacrificed by increasing the duration of the pulse cycle.

J. Optional Saturable Inductor

In a practical design of the earlier converters each thyristor of input and output switch assemblies include snubber elements (not shown) to limit the time rate of change of the forward blocking voltage across these thyristors, and thus, avoid unscheduled turn on of the thyristors. These snubber elements usually comprise a saturable inductor in series with the thyristor, and the series combination of a small capacitor and a resistor coupled in parallel to the thyristor.

In the earlier conventional series resonant converters using pairs of antiparallel thyristors to form bi-directional switches, each such pair of thyristors must be provided with a saturable inductor. In the illustrated embodiments of the present invention, only unidirectional switches, i.e. a single thyristor for one unidirectional switch, are used in the switch assemblies 40, 50. Thus, the $L_R$ resonant inductor 62 advantageously reduces the time rate of change of a forward blocking voltage of the $T_A$ and $T_B$ thyristors in switch assemblies 40, 50.

Moreover, if some applications call for an even higher time rate of reduction, then a single $L_{RS}$ saturable inductor 299 may be placed in series with the $L_R$ resonant inductor 62, rather than a saturable inductor in series with each thyristor of the switch assemblies, as in the earlier converters (see FIG. 5).

Figure 20:
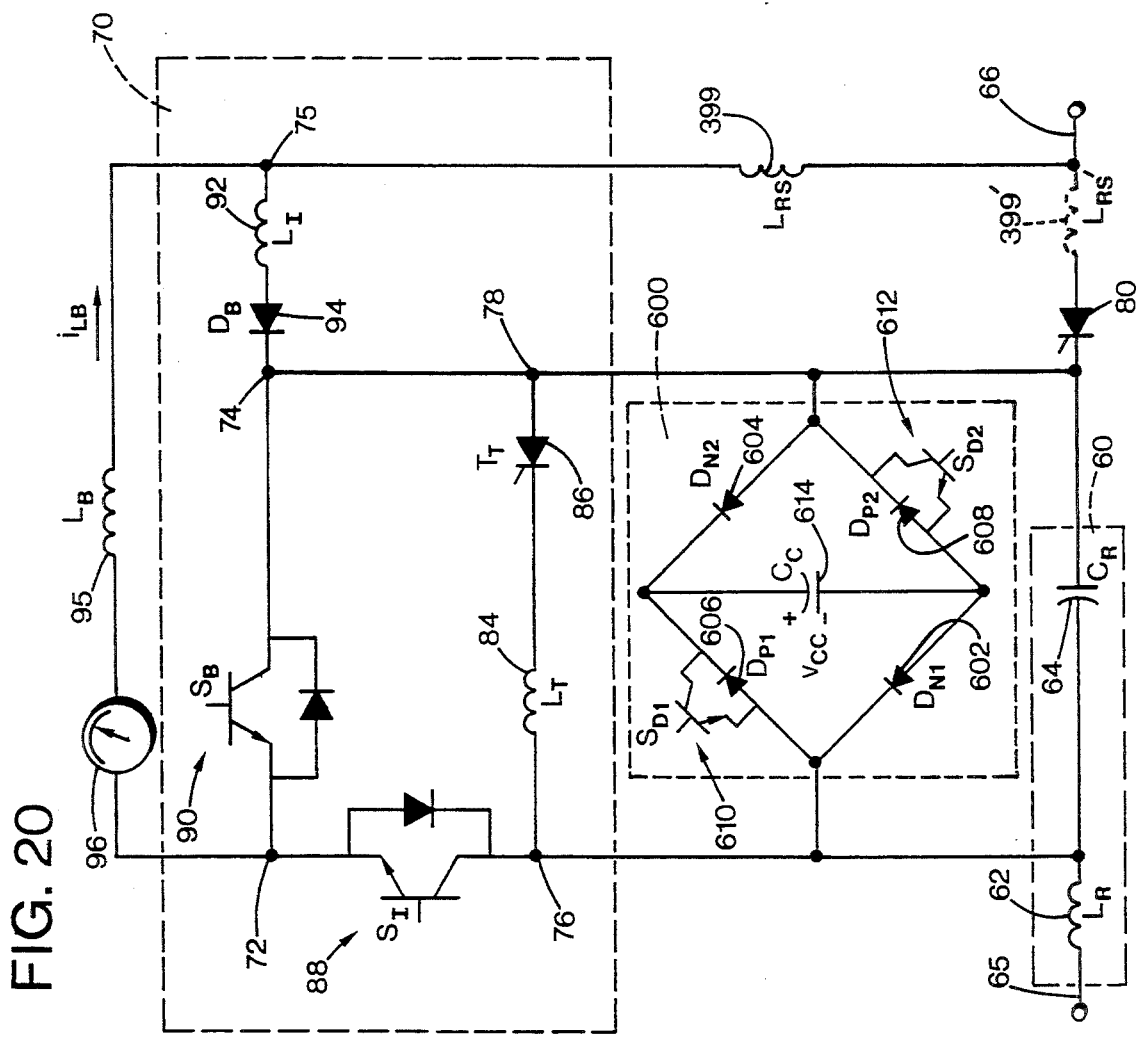
FIG. 20 is a schematic block diagram of one form of a double sided and non-dissipative voltage clamp of the present invention which may be used in any of the embodiments shown in FIGS. 1-4.

Alternatively, in converter 22 of FIG. 1, this an $L_{RS}$ saturable inductor 399 may be coupled between node 75 and conductor 66 (see FIG. 20). Another suitable location for the saturable inductor in converter 22 is shown in dashed lines in FIG. 20 as an $L_{RS}$ saturable inductor 399' coupled between node conductor 66 and the anode of the $T_R$ thyristor 80. Such a saturable inductor 299, 399 or 399' advantageously reduces the turn on losses of the $S_I$ switch 88. The saturable inductor 399' also reduces the reverse recovery current of the $T_R$ thyristor 80.

Referring to FIG. 7, the $S_I$ switch 88 is turned on at $t_1$, $t_{11}$ to initiate the $Z_r$-mode which activates the resonant circuit formed by the $C_R$ resonant capacitor 64 and the $L_I$ inductor 92. Inserting a saturable inductor (not shown) either between the conductor 66 and node 75 or the anode of the $T_R$ thyristor 80 provides this $C_R/L_I$ resonant circuit with additional inductance. Such additional inductance decreases the rate of change of the current through the $S_I$ switch 88 as it is turned on.

The input and output switch assemblies 40 and 50 advantageously use thyristors $T_A$ and $T_B$ as unidirectional switches. To prevent unscheduled turn on of thyristors $T_A$ and $T_B$, the reapplied rate of change of the anode to cathode voltage (known to those skilled in the art as "the reapplied dv/dt turn on phenomenon"), is prevented from reaching excessive values by inserting an $L_{RS}$ optional saturable inductor 199 in series with the $L_R$ resonant inductor 62, for example, as shown in FIG. 5. Optionally, the $L_{RS}$ inductor 199 may also be included in converters 22, 100, 200 and 300 of FIGS. 1–4.

In contrast, the earlier converters require input and output switch assemblies having bi-directional switches formed by pairs of anti-parallel coupled thyristors, further increasing the component cost. These earlier converters require a saturable reactor to be inserted in series with each bi-directional switch, so as many as twelve saturable inductors are needed for a three phase AC-to-AC converter. To avoid voltage jumps on the thyristors not carrying the link current requires using thyristors with higher blocking voltage ratings, which invariably have undesirable higher turn off times. Consequently, the duration of the zero current segment of the link current needs to be increased in the earlier converters.

Alternatively, the earlier converters avoid voltage jumps on nonconducting thyristors by using twelve inductors having a low inductance as compared to the inductance of the resonant inductor. However, these low inductance values require the thyristors to be exposed to a higher reapplied dv/dt values, which forces the zero current segment duration to be increased beyond the turn off time specified by thyristor manufacturers.

The illustrated converters 22, 100, 200 and 300 are not limited by these constraints because there is no need to use pairs of antiparallel thyristors in the input and output switch assemblies as in earlier converters.

To avoid increasing the duration of the zero current segment beyond manufacturer specified turn off times, all of the $T_A$ and $T_B$ thyristors to be turned off are subjected to a firm back-bias voltage for a duration equal to this specified turn off time, as discussed above with respect to the resonant capacitor voltage $v_{CR}$ during the $Z_S$-mode (FIGS. 7 and 8). This feature is not possible using the earlier DC-link converters.

MTSL CONTROLLER

The MTSL controller 400 makes decisions required for operation of the USGL controller 500 based upon considerations of how power flows through the converter via the unipolar link current pulses $i_R$. The MTSL controller 400 may be implemented by commercially available analog and/or digital logic components or their structural equivalents known to those skilled in the art. The term "main" refers to the main $T_A$ and $T_B$ thyristors 41–46, 51–56, and 241–244 of the input and output switch assemblies 40, 50 and 240, rather than the $T_R$ and $T_T$ thyristors 80 and 86 of the link current synthesizer 70.

In the discussion below, the main $T_A$ and $T_B$ thyristors are also designated as thyristors $T_{Amn}$ and $T_{Bmn}$ (with the variables m and n equal to the subscript numerals 1, 2 or 3) as illustrated in FIGS. 1 and 2. In accordance with the power transfer requirements, the MTSL controller 400 selects which thyristors of the input and output switch assemblies 40, 50, 240 will form the current path for the link current pulses $i_R$. For the purposes of illustration, the converter 22 of FIG. 1 will be used to describe operation of the MTSL controller 400.

A. Error Detector

The first task of the MTSL controller 400 is error detection of the input and output voltage waveforms at the respective input and output nodes $A_m$ and $B_m$. The MTSL controller 400 has an error detector 402 for accomplishing these two first basic functions, specifically:

1. Output waveform shaping by controlling the output voltage or output current according to a reference signal representing the desired output waveforms; and
2. Clamping the link current pulse $i_R$ to a desired peak value during the nonzero current segment by controlling the $i_{LB}$ current through the $L_B$ buffer inductor 95 to substantially match a reference value $i_{LB,REF}$.

The output waveform shaping function may be accomplished using an output voltage error detection portion or detector 404 of the error detector 402, as shown in FIG. 17. The clamping of the link current pulse function may be accomplished using an input voltage error detection portion or detector 406 of the error detector 402, as shown in FIG. 18.

It is apparent from the input voltage error detection scheme shown in detector 406, that the MTSL controller 400 may be designed to accomplish additional functions. For example, the MTSL controller 400 may be designed for waveform shaping at the converter input to achieve input power factor control. The MTSL controller 400 may also be designed to accommodate limited voltage ratings of the link elements and the $T_A$ and $T_B$ thyristors of the input and output switch assemblies 40, 50.

Realization of both functions, output waveform shaping and $i_{LB}$ current control, involves a modulation process for controlling the power transfer through the converter 22 by controlling the link current pulses $i_R$. A number of modulation techniques known to those skilled in the art may be used, such as pulse-width modulation, pulse-frequency modulation, pulse-area modulation, and integral-cycle modulation, as discussed in the textbook by Mohan, Undeland and Robbins: *Power Electronics: Converters, Applications and Design*, mentioned above. Both open loop and closed loop schemes for these modulation techniques are possible. In the closed loop scheme, the error of the actual output quantity (voltage or current) with respect to a reference signal is detected. The object of the modulation process is to minimize this error to be within an acceptable limit.

While all of these modulation techniques are applicable to the converter of the present invention, the closed loop pulse area ("CL/PA") modulation technique is preferred. The CL/PA modulation technique maximizes the flexibility of the link current pulses generated between the input and output switch assemblies 40, 50. With CL/PA modulation, the height and duration of both the zero and nonzero segments of the link current pulses are controllable. Using the CL/PA modulation process allows the converter 22 to maintain a high efficiency even during operation at less than full load conditions. High efficiency is maintained because the height and/or the frequency of the link current pulses, and consequently the switching losses, may be decreased as the demands of the load 25 decrease to less than full load power. In the earlier resonant converters, such flexibility was not possible because the height and duration of both the zero and nonzero segments of the pulses were not controllable.

(1) Output Voltage Waveform Control

The output voltage waveform shaping function of the MTSL controller 400 is accomplished with the CL/PA modulation technique using a convenient manner of sensing the area of the link current pulse, i.e. the time integral of the link current pulse. The link current pulse area is determined by sensing the line-to-line output voltage, rather than the link current $i_R$ itself. The line-to-line output voltage is a measure of the pulse area because the output terminals $B_1$, $B_2$ and $B_s$ are terminated by the capacitor filter bank 128 which shorts the high frequency component of the link current $i_R$.

Referring to FIGS. 6 and 17, the detector 404 of the error detector 402 receives a $v_{Bmn}$ line-to-line output voltage sensor signal 408 from a voltage sensor portion 410 of the output sensor assembly 98. The $v_{Bmn}$ sensor signal 408 represents the actual voltage between output lines at the output nodes or terminals $B_m$ and $B_n$. The MTSL controller 400 may have a reference signal generator 412 which generates references for the output voltage and current, $v_{Bmn,REF}$ and $i_{Bn,REF}$, respectively. The signal generator 412 has a voltage reference portion 414 which generates a $v_{Bmn,REF}$ output voltage waveform reference signal 416. The $v_{Bmn,REF}$ reference signal 416 corresponds to a desired waveform for the line-to-line output voltage. Alternatively, the output reference selector 412 may be located remote from the converter 22, and may be a portion of a higher level controller (not shown).

For voltage source operation, that is, for the converter 22 to appear as a voltage source to the load 25, the detector 404 has switch 418 closed and switch 440 open. In this voltage source mode, the $v_{Bmn}$ sensor signal 408 is subtracted from the $v_{Bmn,REF}$ reference signal 416 by a summer device 420 to determine an $EB_{Bmn}$ output voltage error signal 422 according to:

$$E_{Bmn} = v_{Bmn,REF} - v_{Bmn}$$

Each of the three phase voltage error signals 412 is obtained from the summer device 420 which takes the difference of the line-to-line output voltage $v_{B12}$, $v_{B23}$ and $v_{B31}$ signals 408, and the respective $v_{B12,REF}$, $v_{B23,REF}$ and $v_{B31,REF}$ reference signals 416.

For "voltage error modulation," the $E_{Bmn}$ output voltage error signal 422 is subjected to the CL/PA modulation process. Voltage error modulation is more direct and accurate than link current pulse area modulation, because the converter 22 supplies power to the load 25 in accordance with the output voltage pattern reference signal 422. This voltage error modulation process makes the converter 22 appear as a voltage source to the load 25.

The converter 22 may appear as a fast acting current source to the load 25 by exploiting the high frequency of the link current pulses. Current source operation of the converter 22 is possible because the converter may be designed with a modulation frequency which is significantly higher than the frequency of the output voltage or current. The voltage error modulation process may still be applied, although current signals are used for monitoring the output of converter 22 to minimize the output current error.

For current source operation, the MTSL controller 400 selects the output current for reference signals from reference signal generator 412 by opening switch 418 and closing switch 440. The reference signal generator 412 also has a current reference portion 424 which generates an $i_{Bm,REF}$ output current waveform reference signal 426. The $i_{Bm,REF}$ reference signal 426 corresponds to a desired output current waveform, rather than an output voltage waveform. The output sensor assembly 98 has a current sensor portion 428 for generating an $i_{Bm}$ current sensor signal 430 in response to the line current at the output node $B_m$.

FIG. 17 shows that the error detection scheme may include a proportional and derivative ("PD") controller 432 when the MTSL controller 400 selects operation in the current source mode. PD controller 432, may be implemented in software, hardware, or combinations thereof, as known to those skilled in the art. The PD controller 432 significantly increases the accuracy as well as response speed of the controller 398. The derivative portion of the PD controller 432 may be conveniently obtained by inserting small inductors (not shown) between the output sensor assembly 98 and the $B_1$, $B_2$ and $B_3$ load terminals. The line-to-line voltages on both sides of these inductors may be sensed and the voltage differences determined to directly provide the desired derivative signals of the line currents.

The PD controller 432 provides conditioned current signals 434, representative of the output line currents $i_{B1}$, $i_{B2}$ and $i_{B3}$, to a current summer device 436 for subtraction from the respective $i_{B1,REF}$, $i_{B2,REF}$ and $i_{B3,REF}$ reference signals 426. The current summer device 436 provides a current error signal 438 to a current source switch 440 of the detector 404. For current source operation, the current source switch 440 must be closed, and to deactivate the voltage source mode, switch 418 must be open. When switch 440 is closed, the summer device 420 subtracts the $v_{Bmn}$ sensor signal 408 from the current error signal 438 to determine the $E_{Bmn}$ output voltage error signal 422.

Figure 19:
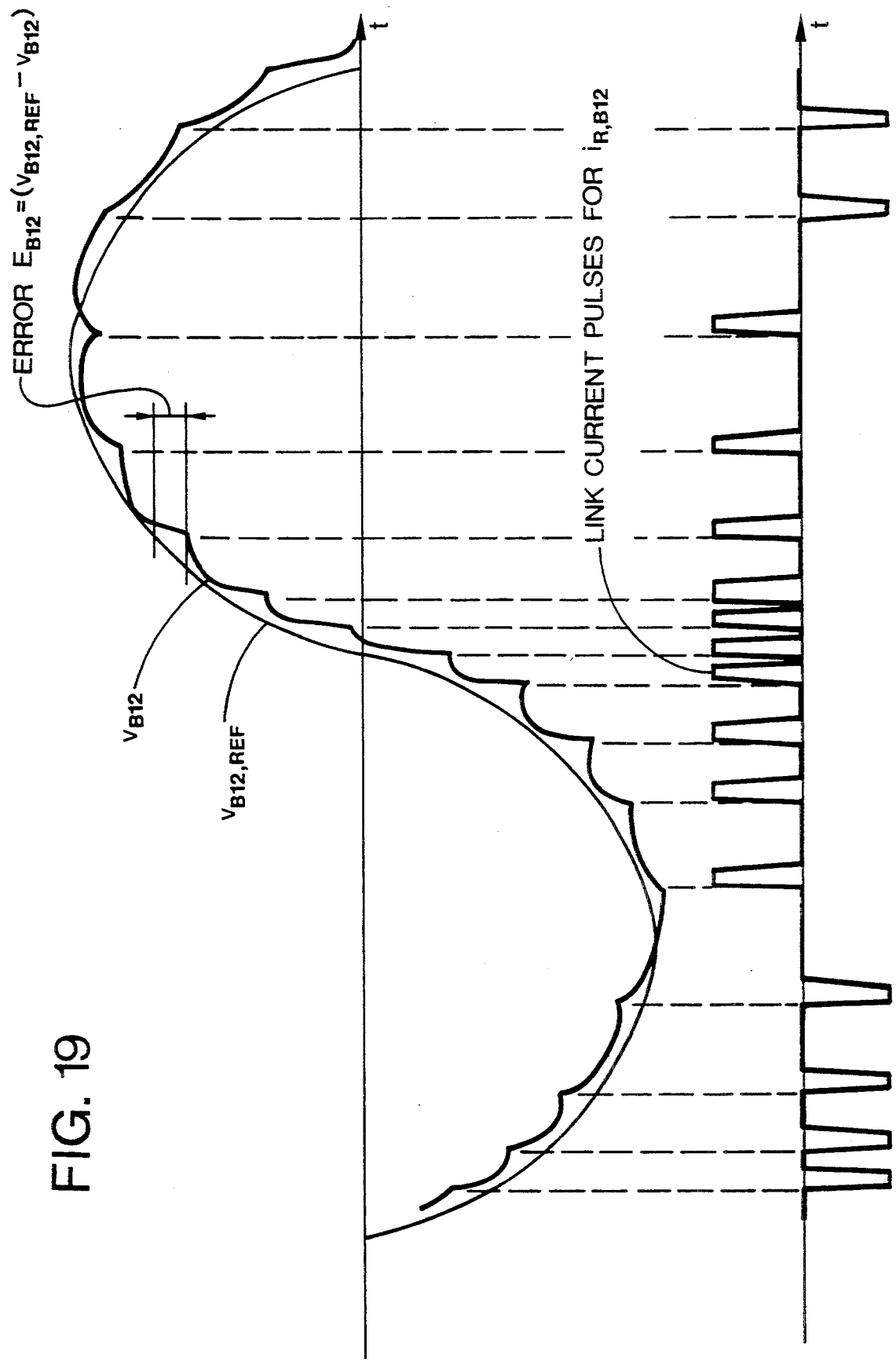
FIG. 19 is a series of graphs showing waveforms associated with the converter illustrated in FIG. 1, showing the line to line output voltage, and the link current pulses.

Referring to FIG. 19, the effect of the CL/PA modulation process on the line-to-line output waveform voltage is illustrated, for the voltage $v_{B12}$ across nodes $B_1$ and $B_2$ of converter 22. The graph of the link current pulses $i_{R,B12}$ illustrates the distribution and routing of the link current pulses $i_R$ associated with the output at nodes $B_1$ and $B_2$. The reference voltage $v_{B12,REF}$ is also shown in FIG. 19 to illustrate the manner in which the line-to-line voltage $v_{B12}$ tracks the $v_{B12,REF}$ reference waveform. The $E_{B12}$ error at one point in time is also illustrated in FIG. 19.

(2) Input Power Factor Control and Buffer Inductor Current Control

The second basic function of the MTSL controller 400 is to clamp the link current pulse peak to the value of the $i_{LB}$ current flowing through $L_B$ buffer inductor 95. Referring to FIGS. 17 and 19, the input voltage error detector 406 of the error detector 402 accomplishes this second function by detecting the error of the $i_{LB}$ current 96 with respect to a reference signal 442. The reference signal 442 represents a selected value of the buffer current which may be generated by an $i_{LB}$ reference signal generator 444. This error signal 450 provides the necessary information for the control strategy to select the $T_{Amn}$ input thyristors which will carry the link current $i_R$. The discussion above illustrated the principles of selecting the $T_{Bmn}$ thyristors of the output switch assembly on the basis of the voltage error modulation process. The principles for selecting the $T_{Amn}$ input thyristors show that a similar modulation process may be applied, except the error signal is based on the buffer current and the input current waveforms.

The MTSL controller 400 is provided with reference current signal generator 442 which generates an $i_{LB,REF}$ buffer current reference signal 444. The $i_{LB,REF}$ reference signal 444 corresponds to a desired magnitude of the buffer current $i_{LB}$, which in turn corresponds to a desired peak value of the link current pulses $i_R$ during the F-mode of operation (see FIG. 7). Alternatively, the buffer current reference selector 442 may be located remote from the converter 22, and may be a portion of a higher level controller (not shown).

The input voltage error detector 406 receives an $i_{LB}$ buffer current sensor signal 446 from the $i_{LB}$ current sensor 96. The $i_{LB}$ buffer current sensor signal 446 represents the actual $i_{LB}$ current flowing through the $L_B$ inductor 95. The detector 406 has a summer device 448 for determining the deviation of the actual $i_{LB}$ current from the reference by subtracting the $i_{LB}$ sensor signal 446 from the $i_{LB,REF}$ reference signal 444 to determine an $E_{LB}$ error signal 450 according to:

$$E_{LB} = i_{LB,REF} - i_{LB}$$

By controlling the $i_{LB}$ buffer current, the height of the link current pulse $i_R$ may be controlled to any selected value $i_{LB,REF}$. Limiting the link current $i_R$ to a selected peak value aids in reducing the rating of the components for converter 22.

The input sensor assembly 97 has a current sensor portion 452 and a voltage sensor portion 454. The voltage sensor portion 454 generates a $v_{Amn}$ line-to-line input voltage sensor signal 456 in response to the actual voltage between input lines at nodes $A_m$ and $A_n$. The current sensor portion 452 generates an $i_{Am}$ current sensor signal 458 in response to the line current at the input node $A_m$.

The detector 406 has a proportional and derivative ("PD") controller 460 which may be as described above for the PD controller 432. The PD controller 460 enhances the accuracy and response speed of the controller 398. The derivative portion of the PD controller 460 may be conveniently obtained by inserting small inductors (not shown) between the input sensor assembly 97 and the input nodes $A_1$, $A_2$ and $A_3$. The line-to-line voltages on both sides of these inductors may be sensed and the voltage differences determined to directly provide the desired derivative signals of the line currents. The PD controller 460 provides conditioned input current signals 462, representative of the input line currents $i_{A1}$, $i_{A2}$ and $i_{A3}$, to a current summer device 464.

While the reference generator 442 may include current reference signals (not shown) similar to the reference signals generated by the output reference generator 412, the $E_{LB}$ buffer current error signal 450 may be used to synthesize $i_{B1,REF}$, $i_{B2,REF}$ and $i_{B3,REF}$ reference signals for the respective input currents $i_{A1}$, $i_{A2}$ and $i_{A3}$. This input current reference signal synthesis achieves the following two goals simultaneously:

1. Minimizing the buffer inductor current error; and
2. Controlling the power factor at the converter input nodes $A_1$, $A_2$ and $A_3$.

The first goal is accomplished by summer 448 of detector 406. The second goal of input power factor control is accomplished by separately synthesizing the active and reactive components of the input currents. The active reference signal for the in-phase or active component of the input current is simply obtained from the $v_{Amn}$ input voltage sensor signal 456. The signal 456 is multiplied by the $E_{LB}$ error signal 450 to simultaneously minimize error signal 450 and to establish an in-phase reference signal 468 for the input current. The reactive reference signal for the out-of-phase or reactive component of the input current reference is established by first supplying the in-phase reference signal 468 to a phase shifter device 470. The phase shifter device 470 imparts a 90° phase shift to the in-phase reference signal 468 to generate a reactive current reference signal 472. An adjustable gain amplifier 474, with adjustable gain K, receives signal 472 from the phase shifter. The amplifier imparts gain K to signal 472 to generate an amplified reactive current reference signal 476 to the summer device 464. The input power factor is controlled to a selected value by adjusting the gain K. For example, unity power factor at the input of the converter 22 is achieved by setting the gain K of amplifier 474 to zero.

The synthesized signals 462, 468 and 476 are used for an input voltage error detection logic scheme by providing summer 464 with the sensor signal 456 which represents the actual input voltages. This logic scheme provides an output signal for the input voltage error detector 406 comprising an input voltage error signal 478, which is the output of the summer device 464. Thus, the input error detection logic of the detector 406 is similar to the output error detection logic scheme of detector 404 when in the current source mode with switch 440 closed and switch 418 open. However, the input voltage error detector 406 includes the information to control the power factor at the input of the converter 22 due to the sensor signals 456 and 458, as well as the selected buffer current $i_{LB}$. The response of the buffer current control may be improved by including a proportional, integrational and derivative ("PID") controller (not shown) between summer devices 448 and the multiplier 466. The design of PID controllers are well known to those skilled in the art.

B. Link Current Pulse Initiator

The second task of the MTSL controller 400 is initiating the start of a new link current pulse $i_R$. Referring to FIG. 6, the MTSL controller 400 has a link current pulse initiator subcontroller portion or initiator 480 for generating an enable signal 482. The enable signal 482 is supplied, through several other portions of the MTSL controller 400, to the USGL controller 500 to initiate the start of a new link current pulse $i_R$.

The enable signal 482 controls the duration of the zero current segment, i.e. the initiation of the turn on signal for the $S_f$ switch 88. As shown in FIG. 7, at time $t_3$, the $T_A$ and $T_B$ thyristors of switch assemblies 40, 50 are turned on through zero voltage switching (ZVS). The Z-mode terminates at time $t_4$ when the link current $i_R$ begins to increase as current flows through the $T_A$ and $T_B$ thyristors (also defined as the beginning of the initiation or I-mode). Preferably, the duration of the Z-mode is at least longer than the turn off time of the $T_A$ and $T_B$ thyristors, since the Z-mode begins with the turning off of these main thyristors.

To maintain high efficiency at less than full load operating conditions, the duration of the zero current segment (Z-mode) may be made dependent on the maximum value of the input and output voltage error signals 478, 422, which are each inputs to the initiator 480. For example, the duration of the zero current segment (Z-mode) may be adjusted so no new link current pulse is generated as long as both the output and input voltage error signals 422, 478 remain below a selected threshold level.

C. Link Current Pulse Distributor

The third task of the MTSL controller 400 is distributing the link current pulse $i_R$ among pairs of the input nodes $A_1$, $A_2$, $A_3$, for a polyphase input, and among pairs of the output nodes $B_1$, $B_2$, $B_3$. Referring to FIG. 6, the MTSL controller 400 has a link current pulse distributor subcontroller portion or distributor 484 which receives the enable signal 482 from the initiator portion 480, and the error signals 422 and 476 from the error detector 402.

In response to these inputs and the determination scheme selected, the distributor 484 determines the distribution of each link current pulse $i_R$ across a pair of input nodes, and across a pair of output nodes. The distributor 484 generates a node selection signal 486 to indicate which pairs of input and output nodes the distributor has determined will carry the pulse $i_R$. Implementation of this logic using comparators and their structural equivalents is well known to those skilled in the art.

The distributor 484 is the first stage in a main thyristor selection process for selecting which pairs of $T_A$ and $T_B$ thyristors of switch assemblies 40, 50 will carry the link current pulse $i_R$. For example, if the distributor determines the pair output nodes $B_2$ and $B_3$ will carry the link current pulse, one of two pair of thyristors may be selected to carry pulse $i_R$ through the output switch assembly. For example, current may be supplied to pair output nodes $B_2$ and $B_3$ through either the pair of $T_{B21}$ and $T_{B32}$ thyristors 52, 56, or the pair of $T_{B22}$ and $T_{B31}$ thyristors 55, 53. Another subcontroller (described below) executes a second and final stage of the main thyristor selection process (fourth task of the MTSL controller 400) and selects which pair of thyristors will carry the pulse $i_R$ to nodes $B_2$ and $B_3$.

A variety of determination schemes may be used by the distributor 484 to select the input and output node pairs. For example, for a polyphase converter, the distributor 484 may use a maximum voltage error criterion. Under a maximum voltage error criterion, the distributor 484 selects the output node $B_1$, $B_2$, or $B_3$ having the greatest voltage error, and the $T_B$ thyristors of the output switch assembly 50 are fired so link current pulse $i_R$ flows through the selected node. The node having the greatest voltage error may be determined from the output voltage error signal 422 output of detector 404.

The distributor 484 may also use a maximum voltage error criterion to control firing of the $T_A$ thyristors of the input switch assembly 40 so the pulse $i_R$ flows through the selected input node $A_1$, $A_2$ or $A_3$. The input voltage error signal 478, generated by detector 406, is used by the distributor 484 to determine which input node has the greatest voltage error.

In accordance with Kirchhoff's voltage law, the sum of the input line-to-line voltages is zero and the sum of the output line-to-line voltages is zero. Thus, the sum of the voltage error signals at the output, and likewise at the input, is also zero. Since the link current pulse $i_R$ flows through the $C_A$ input filter capacitor assembly 26 and through the $C_B$ output filter capacitor assembly 28, the maximum voltage error criterion simultaneously minimizes the voltage errors.

D. Link Current Pulse Router

The fourth task of the MTSL controller 400 is the last stage in the main thyristor selection process for selecting which pairs of the $T_A$ thyristors of the input switch assembly 40, and which pairs of the $T_B$ thyristors of the output switch assembly 50 will carry the link current pulse $i_R$. Referring to FIG. 6, the MTSL controller 400 has a link current pulse router subcontroller portion or router 488 for selecting the pairs of $T_A$ and $T_B$ thyristors which will deliver the pulse $i_R$ to the respective input and output nodes selected by the distributor 484. The router 488 generates a thyristor selection signal 490 to indicate which pairs of input and output thyristors the router has determined will carry the pulse $i_R$. The pairs of main thyristors are selected by router 488 to reduce the error of the actual voltage with respect to the reference voltage, as determined by the error detector 402.

A variety of selection schemes may be used by the router 488 to select the input and output main thyristor pairs. For example, for a polyphase converter, the router 488 may use a filter capacitor charging criterion based on a decision as to whether the capacitors of filters 26 and 28 are to be charged or discharged by the new link current pulse $i_R$. This criterion may be based on the sign of the voltage error, realizing that the direction of the pulse $i_R$ through the filter capacitors depends upon which pair of thyristors are selected by router 488. Since the train of link current pulses is unipolar, the desired direction of the link current pulse through the filter capacitors 26 and 28 is established by unidirectional switches. This feature is unlike the conventional series resonant converters which require bi-directional switches to accommodate alternating link current (AC) flow.

Consider the example above, where the distributor 484 selects the pair output nodes $B_2$ and $B_3$ to carry the link current pulse because the error of the line-to-line output voltage $v_{B23}$ across the output nodes $B_2$ and $B_3$ is higher than the error of the remaining two voltages ($v_{B31}$ and $v_{B12}$). The router 488 may select either the pair of $T_{B21}$ and $T_{B32}$ thyristors 52, 56, or the pair of $T_{B22}$ and $T_{B31}$ thyristors 55, 53 to carry the pulse $i_R$ to nodes $B_2$ and $B_3$. If the voltage $v_{B23}$ across these lines is positive, but lower than the $v_{B23,REF}$ reference voltage signal 416 (FIG. 17), the $C_B$ output filter capacitor 38 must be charged to reduce the voltage error. Given the direction of the link current pulse $i_R$ toward the load 25, the router 488 selects the $T_{B21}$ and $T_{B32}$ pair of thyristors 52, 56. If the line-to-line voltage $v_{B23}$ is higher than the $v_{B23,REF}$ reference signal 416, then the $C_B$ filter capacitor 38 needs to be discharged and the other pair of thyristors are selected by router, i.e. the $T_{B22}$ and $T_{B31}$ thyristors 55, 53. In general, if the sign of the voltage error $E_{B23} = v_{B23,REF} - v_{B23}$ is positive, then the router 488 selects the $T_{B21}$ and $T_{B32}$ pair of thyristors 52, 56. Otherwise, the router 488 selects the second pair of thyristors $T_{B22}$ and $T_{B31}$.

Basically, the router 488 routes the link current according to the sign of the voltage error signal to reduce the error, for example error $E_{B12}$. The sign of the $E_{B12}$ error signal 422, and the sign of the line-to-line $v_{B12}$ output voltage sensor signal 408, indicate whether energy needs to be supplied to or extracted from the load terminals $B_1$ and $B_2$. As shown in FIG. 19, the actual output voltage $v_{12}$ follows the reference voltage $v_{B12,REF}$ when the distribution, timing and routing of the unipolar link current pulses $i_R$ to nodes $B_1$ and $B_2$ are as shown for the pulses $i_{R,B12}$ in FIG. 19.

In conclusion, the unipolar link current pulses $i_R$ may be bi-directionally routed at the output nodes $B_1$ and $B_2$. For example, selecting the $T_{B11}$ and $T_{B22}$ thyristors 51, 55 to rout the link current $i_R$ to the output nodes $B_1$ and $B_2$ forces the link current in a direction opposite to that if the $T_{B21}$ and $T_{B12}$ thyristors 52, 54 were selected instead. As a result, depending on the routing of the link current pulses $i_{R,B12}$ through the output switch assembly, the output voltage $v_{12}$ either increases or decreases as shown in FIG. 19.

In an actual converter design, a significantly higher number of link current pulses are used than shown in FIG. 19, which has been simplified to illustrate the principles of the CL/PA modulation process. With a high number of pulses, i.e. a high link current frequency, the actual output voltages assume smooth and near-sinusoidal waveforms with low harmonic distortion. For a polyphase output, a higher number of link current pulses $i_R$ are used so the pulses may be distributed to multiple pairs of output nodes. For the three phase converter 22 of FIG. 1 the unipolar link current pulses $i_R$ are distributed into three different link current pulse routes:

1. $i_{R,B23}$ for nodes $B_2$ and $B_3$;
2. $i_{R,B31}$ for nodes $B_3$ and $B_1$; and
3. $i_{R,B12}$ for nodes $B_1$ and $B_2$ (FIG. 19).

Implementation of the logic of router 488 by digital logic elements, well known to those skilled in the art, is preferred, although the router 488 may be implemented in hardware, software or combinations thereof known to be structurally equivalent by those skilled in the art.

The router 488 may employ the same filter capacitor charging criterion and error evaluation procedure to select $T_{Amn}$ thyristor pairs of the input switch assembly 40.

E. Optional Link Driving Voltage ($v_{LD}$) Limiter

The fifth task of the MTSL controller 400 is preferably executed only when the link driving voltage $v_{LD}$ for the next link current pulse $i_R$ is expected to be exceed a selected maximum voltage limit. Limiting the link driving voltage $v_{LD}$ controls the voltage stresses on the link components and on the thyristors in the input and output switch assemblies 40, 50. Referring to FIG. 6, the MTSL controller 400 has a link driving voltage limiter subcontroller portion or link voltage limiter 492 to accomplish this function. The limiter 492 generates a limited enable and selection signal 494 which is provided as an input to the USGL controller 500. The original selection of the thyristor pairs by the distributor 484 and router 488 may be overridden by the link current limiter 492, without significantly diminishing the effectiveness of the output voltage waveform shaping and link current clamping functions.

The following discussion illustrates the principles of the preferred embodiment of the link current limiter 492.

In the process of transferring energy through the converter 22 from cycle to cycle of the link current pulses, all of the $T_A$ and $T_B$ thyristors of switch assemblies 40, 50 are exposed to certain blocking voltages, and all link elements are also exposed to certain voltages. The maximum values of these voltages determines the voltage rating of these converter components. These maximum values are proportional to the $v_{LL,max}$ maximum line-to-line voltages of the source 24 and the load 25, and are also proportional to the $v_{CR,max}$ maximum voltage across the $C_R$ resonant capacitor 64.

For example, for the three phase AC-to-AC series resonant converter 22, a $v_{BB}$ maximum back-bias (cathode to anode) voltage across a $T_A$ or a $T_B$ thyristor at the switch assemblies 40, 50 is, in the worst case, given by:

$$v_{BB,max} = v_{LL,max} + (v_{LD,max} + v_{CR,max})/4$$

The $v_{CR,max}$ maximum value of the resonant capacitor voltage occurs during the $Z_S$-mode as shown in FIG. 7, and is given by:

$$v_{CR,max} = v_{LD,max} + Z_{RI,R} i_{R,max}$$

where $i_R$ is the link current pulse, and $Z_{RI,R}$ is the characteristic impedance of the resonant circuit formed by $L_R$, $C_R$ and $L_I$, with $Z_{RI,R} = [(L_R + L_I)/C_R]^{+\frac{1}{2}}$ (see FIG. 14).

The maximum value of $i_R$ is adjusted by controlling the buffer current $i_{LB}$ to a required peak value associated with the maximum current drawn by the load. The $i_{LB}$ current is controlled by controlling the link driving voltage $v_{LD}$. Therefore, in viewing the two relationships above, clearly the required voltage rating of the $T_A$ and $T_B$ thyristors of switch assemblies 40, 50, and all the link components, may be reduced by limiting the maximum value of the link driving voltage $v_{LD}$.

Referring to converter 22 of FIG. 1, the $v_{LD}$ link driving voltage for the next pulse $i_R$ may be determined from the difference of the $v_A$ and $v_B$ bus voltages ($v_{LD} = v_A - v_B$). The $v_A$ and $v_B$ bus voltages are determined from measurements of the line-to-line voltages by sensors 452 and 410 (FIGS. 17-18) at the input and output terminals.

For effective control under all operating conditions, the $v_{LD}$ voltage is restricted to a maximum value by limiter 492 under both regular and irregular operating conditions. Several different methods may be employed by limiter 492 to control the maximum value of $v_{LD}$. These methods are described with reference to the power balance equations for the converter 22.

Referring to FIG. 7, during the nonzero current pulse segment when power is transferred through the link, the link driving voltage, $v_{LD} = v_A - v_B$, can be assumed to be practically due to the filter capacitors 26 and 28. Multiplying both sides of this equation by the current yields the power balance equation for the nonzero current segment of any single link current pulse (disregarding the losses), according to:

$$p_{LD} = p_A - p_B$$

with:

$p_{LD} = v_{LD} i_R$ = power absorbed by the buffer inductor $L_B$;

$p_A = v_A i_R$ = power generated by the source; and $p_B = v_B i_R$ = power absorbed by the load.

Since each unipolar link current pulse $i_R$ flows in the same direction, from conductor 65 to conductor 66, the link current is always positive in the power balance equations given above. The bus voltage $v_A$ may be controlled to be positive, negative or zero by selecting certain $T_A$ thyristors of the input switch assembly 40 to carry the link current pulse.

When the $T_A$ thyristors are selected so the bus voltage $v_A$ is positive, then $p_A$ is positive and the source 24 generates energy. If the $T_A$ thyristors are selected so $v_A$ is negative, then $p_A$ is likewise negative and energy is absorbed by the source 24. The $T_A$ thyristors may be selected to short the link at the input switch assembly 40 by firing the pair of thyristors $T_{Ak1}$ and $T_{Ak2}$, for k equal to 1, 2 or 3. If the link is shorted at the input switch assembly 40, then the $v_A$ bus voltage is zero, $p_A$ is also zero, and the source 24 is prevented from participating in the energy transfer process.

Likewise, if the $T_{Bmn}$ thyristors of the output switch assembly 50 are selected to carry the link current so the $v_B$ bus voltage, and hence $p_B$, are positive, negative or zero, then the load 25 absorbs energy, generates energy, or is prevented from participating in the energy transfer process, respectively. Here, for the output switch assembly 50, the link is shorted by firing the thyristor pair $T_{Bk1}$ and $T_{Bk2}$, for k equal to 1, 2 or 3. For example, if the maximum line-to-line voltage at the input and output of converter 22 is selected to be 1.0 per unit ("p.u."), then the driving voltage $v_{LD}$ may be limited to 1.0 p.u. by shorting the link at either the input or output switch assembly 40, 50.

In transferring average energy through the converter 22, four energy transfer conditions may occur, with two being regular and two irregular. Of the regular energy transfer conditions, the first is a forward energy transfer condition, where the source 24 generates energy which is absorbed by the load. In this first case of forward energy transfer, $p_A$, $v_A$, $p_B$ and $v_B$ are all positive. The second regular energy transfer condition is a reversed energy transfer condition, during which the source 24 absorbs energy generated by the load 25. In this second case of reverse energy transfer, $p_A$, $v_A$, $p_B$ and $v_B$ are all negative. Since the link driving voltage is defined as $v_{LD}=v_A-v_B$, and since the values of $v_A$ and $v_B$ may be limited to a maximum of 1.0 p.u. (by shorting the input and output thyristor assemblies 40, 50), the link driving voltage $v_{LD}$ is also limited a maximum of 1.0 p.u. under the first and second regular energy transfer conditions.

Of the two irregular energy transfer conditions, the first occurs when both the source 24 and load 25 generate energy, and the second occurs when both the source and the load absorb energy. For these irregular cases, $p_A$ and $p_B$ are opposite in sign, and hence, the bus voltages $v_A$ and $v_B$ are likewise opposite in sign. When the $v_A$ and $v_B$ bus voltages have opposite signs, the link driving voltage, $v_{LD}=v_A-v_B$, attains a maximum value of 2.0 p.u. in the worst case.

Fortunately, no significant loss of control is incurred if $v_{LD}$ is restricted to a maximum of, for example, 1.0 p.u. The $v_{LD}$ voltage is prevented from exceeding this maximum by selecting the $T_A$ and $T_B$ thyristors of switch assemblies 40, 50 to force either the $v_A$ or the $v_B$ bus voltage to zero (by shorting the link) during such irregular energy transfer conditions when $v_{LD}$ would otherwise exceed 1.0 p.u. This prevention step may be accomplished in three different ways.

First, consider the irregular case where both the source 24 and load 25 generate energy so $v_A$ is positive and $v_B$ is negative. In this case, the link driving voltage $v_{LD}$ is positive, which in turn, causes the $i_{LB}$ buffer inductor current to increase according to:

$$L_B(di_{LB}/dt)=v_{LD}$$

However, to increase the $i_{LB}$ current, it is not necessary to have both the source 24 and load 25 generate energy. A second manner of forcing the $i_{LB}$ current to increase entails selecting certain of the $T_A$ and $T_B$ thyristors of switch assemblies 40, 50 so only the source 24 generates energy, and the load is shorted to prevent it from participating in the energy transfer process. In this case, $v_A$ is positive and $v_B$ zero, which forces the $i_{LB}$ current to increase because $v_{LD}$ is still positive.

Finally, a third possibility for forcing the $i_{LB}$ buffer inductor current to increase is to force the load 25 to generate energy while the source 24 is shorted to prevent it from participating in the energy transfer process.

Similarly, during any particular link current pulse the $i_{LB}$ buffer inductor current may be forced to decrease in three ways:
1. By forcing both the source 24 and load 25 to absorb energy;
2. By forcing the source 24 to absorb energy, while shorting the load 25 to prevent it from participating in the energy transfer process; and
3. By forcing the load 25 to absorb energy while shorting the source 24 to prevent it from participating in the energy transfer process.

Since any of these three methods prevent $v_{LD}$ from exceeding 1.0 p.u, there is no great loss of control of the $i_{LB}$ buffer inductor current if the MTSL controller 400 applies only the second and third methods, rather than the first, for increasing or decreasing the $i_{LB}$ current when $v_{LD}$ would otherwise 1.0 p.u. Thus, it is preferable to force either the source 24 or load 25 to generate or absorb energy, while the other is shorted, to control $i_{LB}$ and $v_{LD}$.

This logic routine may be implemented in the link voltage limiter 492 in hardware, software, or combinations thereof known to those skilled in the art. After the $T_A$ and $T_B$ thyristors are selected by the router 488, the limiter 492 checks the resulting value of the link driving voltage $v_{LD}=v_A-v_B$. If the $v_{LD}$ voltage exceeds 1.0 p.u., the limiter 492 modifies the $T_A$ and $T_B$ selection process by shorting the link with the thyristors at either the input switch assembly 40 or the output switch assembly 50, which forces $v_A$ or $v_B$, respectively, to be zero. Thus, the limiter 492 restricts the link driving voltage $v_{LD}$ from exceeding a maximum of 1.0 p.u. so overvoltage damage to the link components and the main $T_A$ and $T_B$ thyristors is prevented.

CLAMPING THE RESONANCE CAPACITOR VOLTAGE

FIG. 20 illustrates an alternate embodiment of the link portion of the converters 22, 100, 200, and 300 of FIGS. 1, 2, 3, 4 and 5, which may be inserted between the input and output switch assemblies. For example, referring to FIG. 1, converter 22 may include a double-sided and non-dissipative voltage clamping device, such as a $v_{CR}$ voltage clamp 600, connected in parallel to the $C_R$ resonant capacitor 64.

Thus, no modification of the circuits of any of the preferred embodiments of converters 22, 100, 200 or 300 is required, nor do link elements and their interconnections require any modification to include clamp 600. While the clamp 600 is illustrated as a device separate from the synthesizer 70, it is apparent that the synthesizer of the present invention may be constructed to include the clamp 600. The clamp 600 limits the required voltage ratings of all switches and thyristors used in the converter 22, in addition to the protective voltage limiting feature of the link driving voltage limiter 492.

The voltage clamp 600 comprises a bridge arrangement of four diodes, specifically a first pair of $D_{N1}$ and $D_{N2}$ diodes 602 and 604, and a second pair of $D_{P1}$ and $D_{P2}$ diodes 606 and 608. The clamp 600 also has two $S_{D1}$ and $S_{D2}$ controllable switches 610 and 612, referred to as discharge switches below, coupled in parallel with the respective $D_{P1}$ and $D_{P2}$ diodes 606 and 608. The clamp 600 includes a $C_c$ capacitor 614 which may be chosen to have a capacitance significantly higher than that of the $C_R$ resonant capacitor 64. The $C_c$ capacitor 614 functions as a DC buffer capacitor, similar to those used in conventional DC link converters, for example PWM converters.

The clamp 600 clamps the resonant capacitor voltage $v_{CR}$ to reduce the required voltage ratings of all switches and thyristors used in the converters of the present invention. The maximum blocking voltages of all switches and diodes in the synthesizer 70 are essentially determined by the maximum value of the resonant capacitor voltage $v_{CR}$. Moreover, the maximum blocking voltage of the $T_A$ and $T_B$ thyristors of switch assemblies 40, 50 depends not only upon the link driving voltage $v_{LD}$, but also upon the resonant capacitor voltage $v_{CR}$. This follows from the relationship given earlier for the maximum back-bias voltages $v_{BB,max}$ of the $T_A$ and $T_B$ thyristors, specifically:

$$v_{BB,max} = v_{LL,max} + (v_{LD,max} + v_{CR,max})/4$$

where $v_{LL,max}$ is the maximum line-to-line voltage.

Preferably, clamping of the resonant capacitor voltage is double-sided. That is, the clamp 600 clamps both positive and negative polarities of the $v_{CR}$ voltage. Double sided clamping is preferred because the resonant capacitor voltage $v_{CR}$ reaches a maximum positive value during the $Z_S$-mode of operation and a minimum negative value during the $F_S$-mode, as shown in FIG. 7.

To illustrate the benefit of including the $v_{CR}$ voltage clamp 600, consider the maximum line-to-line voltage $v_{LL,max}$ at the input and output terminals of converter 22 to be 1.0 p.u., and the maximum link2 current $i_R$ to be also 1.0 p.u. To assure zero voltage switching (ZVS) and/or zero current switching (ZCS), as well as to account for fluctuations in the $i_{LB}$ buffer inductor current, the characteristic impedances may be selected, for instance, as $Z_{R,R} = 1.3$ p.u. and $Z_{RI,R} = 1.5$ p.u. Given these values, without the voltage clamp 600 the maximum value of the resonant capacitor voltage would reach:

$v_{CR,max} = +2.5$ p.u. during the $Z_S$-mode; and $v_{CR,max} = -2.3$ p.u. during the $F_S$-mode, assuming the link driving voltage limiter 492 of FIG. 6 is included to limit the $v_{LD}$ link driving voltage to a maximum of 1.0 p.u. However, for successful generation of the link current pulses $i_R$ as well as proper transfer of energy through the converter, the resonant capacitor voltage $v_{CR}$ may be constrained to values only slightly higher than 1.0 p.u. to obtain a sufficient back-bias voltage for the $T_A$ and $T_B$ thyristors in switch assemblies 40, 50. For example, limiting the maximum value of the resonant capacitor voltage $v_{CR,max}$ to 1.3 p.u. is more than adequate if the maximum line-to-line voltage of 1.0 p.u. corresponds to an rms voltage of 480 V.

The principles of clamping the $v_{CR}$ resonant capacitor voltage to this value of 1.3 p.u. (or any other selected value) with the voltage clamp 600 may be illustrated as follows. Consider the $C_c$ capacitor 614 to be precharged to a selected DC voltage $v_{CC}$ of 1.3 p.u. with the polarity as shown in FIG. 20.

The graphs of FIG. 7 show that the resonant capacitor voltage $v_{CR}$ rises to a maximum positive value during the T-mode. As $v_{CR}$ reaches 1.3 p.u., the $D_{P1}$ and $D_{P2}$ diodes 606 and 608 begin to conduct which causes the $C_c$ buffer capacitor 614 to clamp the resonant capacitor voltage $v_{CR}$. Likewise, as the resonant capacitor voltage $v_{CR}$ decreases to a negative minimum value during the I-mode, the $D_{N1}$ and $D_{N2}$ diodes 602 and 604 start to conduct as $v_{CR}$ reaches the $v_{CC}$ buffer capacitor voltage of 1.3 p.u. The clamp 600 is automatically inactive when the magnitude of the $v_{CR}$ resonant capacitor voltage is less than 1.3 p.u. because all of the diodes of the clamp 600 are essentially in a current blocking state.

When the resonant capacitor voltage $v_{CR}$ is clamped by the buffer capacitor voltage $v_{CC}$, the $C_c$ buffer capacitor 614 is essentially charged by the $C_R$ resonant capacitor 64, and over time $v_{CC}$ may rise to an unacceptable voltage level. The $S_{D1}$ and $S_{D2}$ discharge switches 610 and 612 avoid this buffer capacitor voltage build-up by closing just before or simultaneously with the closing the $S_I$ switch 88 at $t_1$ and $t_{11}$ when the $Z_t$-mode begins (see FIG. 7). The closing of the discharge switches 610 and 612 occurs at substantially at zero switch voltage (ZVS). When the $S_{D1}$ and $S_{D2}$ switches 610 and 612 close, the $v_{CC}$ voltage of the $C_c$ capacitor 614 is discharged into the $L_B$ buffer inductor 95. The discharge switches 610 and 612 may be kept closed until the selected voltage level of the buffer capacitor $C_c$ is regained, here 1.3 p.u. Opening the $S_{D1}$ and $S_{D2}$ switches again occurs at substantially zero switch voltage (ZVS), to release the clamping on the resonant capacitor voltage $v_{CR}$. At this point in time, further performance of the converter may be as described above with reference to FIG. 7.

ADVANTAGES

The converter of the present invention, and particularly as illustrated by converters 22, 100, 200 and 300 of FIGS. 1–4, is cost competitive with the earlier types of static power converters without compromising the attractive features of series resonant converters in general. These features include bi-directional and four quadrant operation capabilities, power transfer from lower to higher voltages (step-up mode operation), generation of balanced sinusoidal output voltages which are insensitive to unbalanced loading, and tolerance to dynamic changes of supply voltages, to name a few.

From a comparison of the converters of FIGS. 1–4, it is apparent that the converter of the present invention may advantageously convert DC or AC single phase input power, or polyphase input power, efficiently into DC or AC single phase output power or polyphase output power.

As another advantage, the converter of the present invention may minimize and control the peak value of the link current pulses. Minimizing the link current pulse peak value significantly reduces the cost of practically all converter components compared with earlier converters. For example, under full load operating conditions, the converter of the present invention may limit the ratio of the peak to the average value of the link current pulses, so over an entire pulse cycle this ration exceeds unity by only a fraction, rather than a multiple, as experienced by the earlier converters.

As further advantage, the converter of the present invention may minimizes the number of switches in the input and output switch assemblies 40, 50 over those required in conventional full bridge series resonant converters. Furthermore, the converter of the present invention uses of the most cost effective type of switches in assemblies 40, 50, i.e. unidirectional, single $T_A$ and $T_B$ thyristors, rather than costly controllable turn off switches or bi-directional switches comprising pairs of unidirectional switches connected in antiparallel or anti-series. Moreover, the converter of the present invention has no need for saturable inductors inserted in series with the input and output switches to prevent unscheduled thyristor turn on, as required with the bi-directional switches of the earlier full bridge and half bridge converters.

The converter of the present invention is more economically constructed than earlier converters because the voltage ratings of the switches and storage elements are minimized. For example, in the embodiment of FIG. 20, the converter of the present invention meets non-dissipative design criteria by limiting the maximum voltage across the resonant capacitor. This limiting feature in turn limits the maximum blocking voltage to only a fraction above the maximum line-to-line input or output voltage, rather than multiples above, as experienced with the earlier converters.

The present invention also provides a method of controlling power flow, either unidirectionally or bidirectionally, between a source 24, 124 or 224, and a load 25, 125 or 325. The illustrated method assures minimal switching losses for all converter switches by employing substantially zero current switching (ZCS) or substantially zero voltage switching (ZVS).

The illustrated method of the present invention provides flexible control of the link current pulses characteristics, including pulse height, pulse width, and the width of each pulse cycle, i.e. the width of the zero and nonzero segments of each cycle are controllable. This flexible method may be used to advantageously sustain a high converter efficiency when operating the converter at less than full load conditions.

Having illustrated and described the principles of my invention with respect to several preferred embodiments, it should be apparent to those skilled in the art that my invention may be modified in arrangement and detail without departing from such principles. For example, other arrangements link current synthesizers 70 and 270 may be used, as well as other arrangements of MTSL and USGL controllers, the input and output sensors, filters and switch assemblies. I claim all such modifications falling within the scope and spirit of the following claims.

I claim:

1. A unipolar series resonant converter for exchanging energy between first and second circuits, comprising:
   first and second switch assemblies for coupling to the respective first and second circuits; a resonant tank coupled between the first and second switch assemblies, the resonant tank having a resonant capacitor and a resonant inductor in series; and
   a link current synthesizer coupled to the resonant capacitor, the synthesizer responsive to a synthesizer control signal for generating a link current as a train of unipolar link current pulses, each pulse having a zero current segment and a nonzero segment of adjustable durations which are controlled by said synthesizer, with the synthesizer having a blocking switch coupled in series with the resonant capacitor for deactivating oscillation of the resonant tank in initiating each unipolar link current pulse.

2. A unipolar series resonant converter according to claim 1 wherein the link current synthesizer includes at least one switch, with at most one switch conducting during energy exchange.

3. A unipolar series resonant converter according to claim 2 wherein the link current synthesizer includes at least one inductor element for switching each synthesizer switch at, at least one of, zero voltage and zero current.

4. A unipolar series resonant converter according to claim 2 further including a non-dissipative voltage clamping device in parallel with the resonant capacitor for limiting the voltage of each converter switch.

5. A unipolar series resonant converter according to claim 4 wherein the voltage clamping device comprises a bridge arrangement of a first pair of diodes, a pair of controllable discharge switches each coupled in parallel with a second pair of diodes, and a DC buffer capacitor coupled to the bridge arrangement in parallel with the resonant capacitor.

6. A unipolar series resonant converter according to claim 1 wherein the blocking switch comprises a thyristor turned off by natural commutation through resonant oscillation.

7. A unipolar series resonant converter according to claim 1 wherein the first and second switch assemblies each comprise thyristor bridges.

8. A unipolar series resonant converter according to claim 7 wherein the converter further includes a controller for generating gate signals for the thyristors of the first and second switch assemblies to turn on at substantially zero voltage and current, and to turn off by natural commutation through resonance oscillation.

9. A unipolar series resonant converter according to claim 1 wherein the synthesizer comprises at least one diode and at least one discharge switch, with each diode brought into conduction at substantially zero voltage, and each discharge switch turned on and off at substantially zero voltage.

10. A unipolar series resonant converter according to claim 1 wherein the link current synthesizer includes a link current buffer device coupled to the synthesizer for clamping the link current pulses.

11. A unipolar series resonant converter according to claim 1 further including:
   plural sensors for monitoring the link current, and currents and voltages of the first and second circuits, with the sensors generating sensor signals in response thereto; and
   a controller responsive to the sensor signals for generating the synthesizer control signal.

12. A unipolar series resonant converter according to claim 1 further including a saturable inductor in series with one element of the group of elements comprising the resonant inductor and the blocking switch.

13. A unipolar series resonant converter according to claim 1 wherein the resonant tank is coupled in series with the first and second switch assemblies.

14. A unipolar series resonant converter according to claim 1 wherein:
   the first and second switch assemblies each comprise a bridge arrangement of plural thyristors each responsive to a gate signal;
   first and second filter assemblies for coupling to the respective first and second circuits;
   the blocking switch comprises a thyristor turned off by natural commutation through resonant oscillation;
   the link current synthesizer includes:
      at least one discharge switch, with at most one discharge switch conducting during energy exchange, with each discharge switch turned on and off at substantially zero voltage;
      at least one diode, with each diode brought into conduction at substantially zero voltage;
      a link current buffer device coupled to the synthesizer;
      at least one inductor element for switching each synthesizer switch at times of, at least one of, zero voltage and zero current;
   the converter also includes a non-dissipative voltage clamping device in parallel with the resonant capacitor for limiting the voltage of the plural converter switches, the voltage clamping device comprising a bridge arrangement of a first pair of diodes, a pair of controllable discharge switches each coupled in parallel with a second pair of diodes, and a DC buffer capacitor coupled to the clamping bridge arrangement in parallel with the resonant capacitor; and the converter further includes a controller for generating gate signals for the thyristors of the first and second switch assemblies to cause them to turn on at substantially zero voltage and current, and to turn off by natural commutation through resonance oscillation.

15. A unipolar series resonant converter according to claim 14 wherein the resonant tank is coupled in series with the first and second switch assemblies.

16. A unipolar series resonant converter according to claim 1 wherein the resonant tank is coupled in parallel with the first and second switch assemblies.

17. A unipolar series resonant converter according to claim 16 wherein:

the first and second circuits comprise grounded systems sharing a common neutral potential;

the converter further includes a first shorting thyristor for selectively coupling the resonant tank to the neutral potential, and a second shorting thyristor for selectively coupling the blocking switch to the neutral potential.

18. A unipolar series resonant converter according to claim 1 wherein:

the first circuit comprises a DC system having two conductors;

the converter further includes a first terminating capacitor filter for coupling across the two DC conductors of the first circuit; and the first switch assembly comprises a first thyristor for coupling in series with DC conductor of the first circuit, and a free-wheeling diode for coupling across the two DC conductors.

19. A unipolar series resonant converter according to claim 1 wherein the first circuit comprises an AC system, and the first switch assembly comprises:

a diode bridge assembly having a DC output with two DC bridge output conductors, and an AC input for coupling to the first circuit;

a first terminating capacitor filter for coupling across the two bridge output conductors; and a first thyristor for coupling in series with one bridge output conductor, and a free-wheeling diode for coupling across the two bridge output conductors.

20. A unipolar series resonant converter for exchanging energy between first and second circuits, comprising:

first and second switch assemblies for coupling to the respective first and second circuits;

a resonant tank coupled between the first and second switch assemblies, the resonant tank having a resonant capacitor and a resonant inductor in series;

a link current synthesizer coupled to the resonant capacitor, the synthesizer responsive to a synthesizer control signal for generating a link current comprising a train of unipolar link current pulses, with each pulse comprising a nonzero current segment and adjacent pulses separated by a zero current segment, the zero and nonzero current segments being controllable in duration by the synthesizer; and a blocking switch in series with the resonant capacitor.

21. A unipolar series resonant converter according to claim 20 wherein the link current synthesizer includes at least one switch, with at most one switch conducting during energy exchange.

22. A unipolar series resonant converter according to claim 21 wherein the link current synthesizer includes at least one inductor element for switching each synthesizer switch at, at least one of, zero voltage and zero current.

23. A unipolar series resonant converter according to claim 21 further including a non-dissipative voltage clamping device in parallel with the resonant capacitor for limiting the voltage of each converter switch.

24. A unipolar series resonant converter according to claim 23 wherein the voltage clamping device comprises a bridge arrangement of a first pair of diodes, a pair of controllable discharge switches each coupled in parallel with a second pair of diodes, and a DC buffer capacitor coupled to the bridge arrangement in parallel with the resonant capacitor.

25. A unipolar series resonant converter according to claim 20 wherein the blocking switch comprises a thyristor turned off by natural commutation through resonant oscillation.

26. A unipolar series resonant converter according to claim 20 wherein the first and second switch assemblies each comprise thyristor bridges.

27. A unipolar series resonant converter according to claim 26 wherein the converter further includes a controller for generating gate signals for the thyristors of the first and second switch assemblies to turn on at substantially zero voltage and current, and to turn off by natural commutation through resonance oscillation.

28. A unipolar series resonant converter according to claim 20 wherein the synthesizer comprises at least one diode and at least one discharge switch, with each diode brought into conduction at substantially zero voltage, and each discharge switch turned on and off at substantially zero voltage.

29. A unipolar series resonant converter according to claim 20 wherein the link current synthesizer includes a link current buffer device coupled to the synthesizer for clamping the link current pulses.

30. A unipolar series resonant converter according to claim 20 further including:

plural sensors for monitoring the link current, and currents and voltages of the first and second circuits, with the sensors generating sensor signals in response thereto; and a controller responsive to the sensor signals for generating the synthesizer control signal.

31. A unipolar series resonant converter according to claim 20 further including a saturable inductor in series with one element of the group of elements comprising the resonant inductor and the blocking switch.

32. A unipolar series resonant converter according to claim 20 wherein the resonant tank is coupled in series with the first and second circuits.

33. A unipolar series resonant converter according to claim 20 wherein:

the first and second switch assemblies each comprise a bridge arrangement of plural thyristors each responsive to a gate signal;

first and second filter assemblies for coupling to the respective first and second circuits;

the blocking switch comprises a thyristor turned off by natural commutation through resonant oscillation;

the link current synthesizer includes:

at least one discharge switch, with at most one discharge switch conducting during energy exchange, with each discharge switch turned on and off at substantially zero voltage;

at least one diode, with each diode brought into conduction at substantially zero voltage;

a link current buffer device coupled to the synthesizer;

at least one inductor element for switching each synthesizer switch at times of, at least one of, zero voltage and zero current;

the converter also includes a non-dissipative voltage clamping device in parallel with the resonant capacitor for limiting the voltage of the plural converter switches, the voltage clamping device comprising a bridge arrangement of a first pair of diodes, a pair of controllable discharge switches each coupled in parallel with a second pair of diodes, and a DC buffer capacitor coupled to the clamping bridge arrangement in parallel with the resonant capacitor; and the converter further includes a controller for generating gate signals for the thyristors of the first and second switch assemblies to cause them to turn on at substantially zero voltage and current, and to turn off by natural commutation through resonance oscillation.

34. A unipolar series resonant converter according to claim 33 wherein the resonant tank is coupled in series with the first and second circuits.

35. A unipolar series resonant converter according to claim 20 wherein the resonant tank is coupled in parallel with the first and second circuits.

36. A unipolar series resonant converter according to claim 35 wherein:

the first and second circuits comprise grounded systems sharing a common neutral potential;

the converter further includes a first shorting thyristor for selectively coupling the resonant tank to the neutral potential, and a second shorting thyristor for selectively coupling the blocking switch to the neutral potential.

37. A unipolar series resonant converter according to claim 20 wherein:

the first circuit comprises a DC system having two conductors;

the converter further includes a first terminating capacitor filter for coupling across the two DC conductors of the first circuit; and the first switch assembly comprises a first thyristor for coupling in series with DC conductor of the first circuit, and a free-wheeling diode for coupling across the two DC conductors.

38. A unipolar series resonant converter according to claim 20 wherein the first circuit comprises an AC, and the first switch assembly comprises:

a diode bridge assembly having a DC output with two DC bridge output conductors, and an AC input for coupling to the first circuit;

a first terminating capacitor filter for coupling across the two bridge output conductors; and a first thyristor for coupling in series with one bridge output conductor, and a free-wheeling diode for coupling across the two bridge output conductors.

39. A unipolar series resonant converter for exchanging energy between first and second circuits, comprising:

first and second switch assemblies for coupling to the respective first and second circuits;

a resonant tank for coupling together the first and second circuits;

a link current synthesizer coupled to the resonant tank, the synthesizer responsive to a synthesizer control signal for generating a link current as a train of unipolar current pulses, each pulse having a zero current segment and a nonzero current segment of adjustable durations which are independently controlled by said synthesizer; and a link current buffer device coupled to the synthesizer for clamping the link current to a selected value during energy exchange.

40. A unipolar series resonant converter according to claim 39 wherein the link current synthesizer includes at least one switch, with at most one switch conducting during energy exchange.

41. A unipolar series resonant converter according to claim 40 wherein the link current synthesizer includes at least one inductor element for switching each synthesizer switch at, at least one of, zero voltage and zero current.

42. A unipolar series resonant converter according to claim 40 further including a non-dissipative voltage clamping device in parallel with the resonant capacitor for limiting the voltage of each converter switch.

43. A unipolar series resonant converter according to claim 42 wherein the voltage clamping device comprises a bridge arrangement of a first pair of diodes, a pair of controllable discharge switches each coupled in parallel with a second pair of diodes, and a DC buffer capacitor coupled to the bridge arrangement in parallel with the resonant capacitor.

44. A unipolar series resonant converter according to claim 39 wherein the first and second switch assemblies each comprise thyristor bridges.

45. A unipolar series resonant converter according to claim 44 wherein the converter further includes a controller for generating gate signals for the thyristors of the first and second switch assemblies to turn on at substantially zero voltage and current, and to turn off by natural commutation through resonance oscillation.

46. A unipolar series resonant converter according to claim 39 wherein the synthesizer comprises at least one diode and at least one discharge switch, with each diode brought into conduction at substantially zero voltage, and each discharge switch turned on and off at substantially zero voltage.

47. A unipolar series resonant converter according to claim 39 wherein the converter further includes a blocking switch coupled in series with the resonant capacitor.

48. A unipolar series resonant converter according to claim 47 further including a saturable inductor in series with one element of the group of elements comprising the resonant inductor and the blocking switch.

49. A unipolar series resonant converter according to claim 39 wherein the 47 blocking switch comprises a thyristor turned off by natural commutation through resonant oscillation.

50. A unipolar series resonant converter according to claim 39 further including:

plural sensors for monitoring the link current, and currents and voltages of the first and second circuits, with the sensors generating sensor signals in response thereto; and a controller responsive to the sensor signals for generating the synthesizer control signal.

51. A unipolar series resonant converter according to claim 39 wherein the resonant tank is coupled in series with the first and second circuits.

52. A unipolar series resonant converter according to claim 39 wherein:

the first and second switch assemblies each comprise a bridge arrangement of plural thyristors each responsive to a gate signal;

first and second filter assemblies for coupling to the respective first and second circuits;

the link current synthesizer includes:

at least one discharge switch, with at most one discharge switch conducting during energy exchange, with each discharge switch turned on and off at substantially zero voltage;

at least one diode, with each diode brought into conduction at substantially zero voltage;

a link current buffer device coupled to the synthesizer;

at least one inductor element for switching each synthesizer switch at times of, at least one of, zero voltage and zero current;

the converter also includes a non-dissipative voltage clamping device in parallel with the resonant capacitor for limiting the voltage of the plural converter switches, the voltage clamping device comprising a bridge arrangement of a first pair of diodes, a pair of controllable discharge switches each coupled in parallel with a second pair of diodes, and a DC buffer capacitor coupled to the clamping bridge arrangement in parallel with the resonant capacitor; and the converter further includes a controller for generating gate signals for the thyristors of the first and second switch assemblies to turn on at substantially zero voltage and current, and to turn off by natural commutation through resonance oscillation.

53. A unipolar series resonant converter according to claim 52 wherein the resonant tank is coupled in series with the first and second circuits.

54. A unipolar series resonant converter according to claim 39 wherein the resonant tank is coupled in parallel with the first and second circuits.

55. A unipolar series resonant converter according to claim 54 wherein:

the first and second circuits comprise grounded systems sharing a common neutral potential;

the converter further includes a blocking switch coupled in series to the resonant capacitor, and a first shorting thyristor for selectively coupling the resonant tank to the neutral potential, and a second shorting thyristor for selectively coupling the blocking switch to the neutral potential.

56. A unipolar series resonant converter according to claim 39 wherein:

the first circuit comprises a DC system having two conductors;

the converter further includes a first terminating capacitor filter for coupling across the two DC conductors of the first circuit; and the first switch assembly comprises a first thyristor for coupling in series with DC conductor of the first circuit, and a free-wheeling diode for coupling across the two DC conductors.

57. A unipolar series resonant converter according to claim 39 wherein the first circuit comprises an AC system, and the first switch assembly comprises:

a diode bridge assembly having a DC output with two DC bridge output conductors, and an AC input for coupling to the first circuit;

a first terminating capacitor filter for coupling across the two bridge output conductors; and a first thyristor for coupling in series with one bridge output conductor, and a free-wheeling diode for coupling across the two bridge output conductors.

58. A method of converting power between first and second circuits, comprising the steps of:

synthesizing a link current comprising a train of substantially squarewave unipolar link current pulses which are initiated and terminated through resonant oscillations, with each pulse having a zero amplitude segment and a nonzero amplitude segment; and controlling the durations of the zero amplitude segment and the nonzero amplitude segment of each link current pulse by independently adjusting said segment durations.

59. A method of exchanging energy according to claim 58 wherein:

the method further includes the step of switching a plurality of switches coupling together the first and second circuits; and the controlling step comprises controlling the switching step for switching the plurality of switches at substantially zero voltage and zero current.

60. A method of exchanging energy according to claim 58 wherein the synthesizing step comprises synthesizing the link current using a closed loop modulation technique.

61. A method of exchanging energy according to claim 58 wherein the synthesizing step comprises synthesizing the link current for operating in an adjustable current mode.

62. A method of exchanging energy according to claim 58 wherein the synthesizing step comprises synthesizing the link current for operating in an adjustable voltage mode.

63. A method of exchanging energy according to claim 58, further including the step of limiting the amplitude of each link current pulse to a selected value.

64. A method of exchanging energy according to claim 58, wherein limiting step comprises limiting the amplitude of each link current pulse to a selected value of less than 1.5 per unit based upon a rated maximum current of one of the first and second circuits.

65. A method of exchanging energy according to claim 58, wherein the controlling step comprises allowing bi-directional flow of power between the first and second circuits.

66. A method of exchanging energy according to claim 58, wherein the controlling step comprises allowing power flow from a lower voltage level to a higher voltage level of the first and second circuits.

67. A method of exchanging energy according to claim 58 wherein:

the synthesizing step comprises synthesizing the ink current using a closed loop modulation technique;

the method further includes the steps of:

limiting the amplitude of each link current pulse to a selected value to a selected value of less than 1.5 per unit based upon a rated maximum current of one of the first and second circuits; and switching a plurality of switches coupling together the first and second circuits; and the controlling step comprises the steps of:

providing bi-directional flow of power between the first and second circuits from a lower voltage level to a higher voltage level of the first and second circuits; and controlling the switching step for switching the plurality of switches at substantially zero voltage and zero current.

68. A method of exchanging energy according to claim 59, wherein the controlling step comprises the step of limiting voltage across each of the plurality of switches.

69. A link current synthesizer for coupling a series combination of a resonant capacitor, a resonant inductor, and a blocking switch with a link current buffer device for a unipolar series resonant converter, the resonant capacitor and resonant inductor coupled together at a first junction, the resonant capacitor and blocking switch coupled together at a second junction, the link current synthesizer comprising:

first, second and third nodes;

an initiating switch for coupling the first junction to the buffer device at the first node;

a buffer switch coupled to the first node; and an initiation inductor coupled to the buffer switch for initiating the generation of a train of link current pulses through resonant oscillation, each pulse having a zero current segment and a non-zero current segment of independently controllable duration.

70. A link current synthesizer according to claim 69 for a converter having a blocking switch comprising a diode, wherein:

the initiating and buffer switches each comprise a thyristor; and the initiation inductor is coupled to the second junction.

71. A link current synthesizer according to claim 69 for a converter having a blocking switch comprising a thyristor, wherein:

the buffer switch is coupled between the first and second nodes;

the initiation inductor is coupled to the link current buffer device and the blocking switch at the third node;

the synthesizer further comprises:

a buffer diode coupling the initiation inductor to the initiating switch at the second node;

a terminating diode coupled to the second node for coupling to the second junction; and a series connected terminating inductor and terminating thyristor, with the terminating thyristor coupled to the second node, and the terminating inductor for coupling to the first junction.

* * * * *

UNITED STATES PATENT AND TRADEMARK OFFICE
CERTIFICATE OF CORRECTION

PATENT NO. : 5,412,557

DATED : May 2, 1995

INVENTOR(S) : Hian K. Lauw

It is certified that error appears in the above-indentified patent and that said Letters Patent is hereby corrected as shown below:

Column 3, line 60, "In U.S. . . propose" should read --U.S. . .proposes--;

Column 8, line 33, "55" should read --54--;

Column 9, line 51, "invention is shown" should read --invention.--;

Column 10, line 30, "hi-" should read --bi- --;

Column 11, line 53, "combination of thereof" should read --combination thereof--;

Column 14, line 23, "to turned off" should read --to turn off--;

Column 17, line 33, "$t_6$and $t_7$" should read --$t_6$ and $t_7$ --;

Column 19, line 45, "and $t_9$-$t_{10}$ flows" should read --and $t_9$-$t_{11}$ current flows--;

Column 21, line 50, " $=(\Pi/2D)[o,max]$" should read -- $=(\Pi/2D)[i_{o,max}]$;

Column 24, line 58, "$B_1$, $B_2$ and $B_s$" should read --$B_1$, $B_2$ and $B_3$--;

Column 26, line 6, "$i_{\beta1,REF}$, $i_{\beta2,REF}$" should read --$i_{\beta1,REF}$, $i_{\beta2,REF}$,--;

Column 31, line 17, "expected to be exceed" should read --expected to exceed--;

Column 33, line 13, "limited a maximum of" should read --limited to a maximum of--;

UNITED STATES PATENT AND TRADEMARK OFFICE
CERTIFICATE OF CORRECTION

PATENT NO. : 5,412,557
DATED : May 2, 1995
INVENTOR(S) : Hian K. Lauw

It is certified that error appears in the above-indentified patent and that said Letters Patent is hereby corrected as shown below:

Column 33, line 65, "1.0 p.u," should read --1.0 p.u.,--;

Column 34, line 1, "$V_{LD}$ would otherwise 1.0 p.u." should read --$V_{LD}$ would otherwise exceed 1.0 p.u.;

Column 35, line 15, "link2" should read --link--;

Column 35, line 67, "the closing the $S_I$ switch" should read --the closing of the $S_I$ switch--;

Column 36, line 1, "occurs at substantially at zero" should read --occurs at substantially zero--;

Column 36, line 46, "may minimizes the" should read --may minimize the--;

Column 36, line 50, "invention uses of the most" should read --invention uses the most.--;

Column 37, line 24, "other arrangements link" should read --other arrangements of link --;

Column 44, lines 59-60, "the ink current" should read --the link current--;

Column 44, lines 62-63, "to a selected value to a selected value of" should read --to a selected value of--;

UNITED STATES PATENT AND TRADEMARK OFFICE
CERTIFICATE OF CORRECTION

PATENT NO. : 5,412,557

DATED : May 2, 1995

INVENTOR(S) : Hian K. Lauw

It is certified that error appears in the above-indentified patent and that said Letters Patent is hereby corrected as shown below:

Column 45, lines 6-7, "plurality of switches at substantially zero voltage...and zero current"

should read

--error in formatting, substantially zero should be indented and on same line as "at" --;

Signed and Sealed this

FourthDay of August, 1998

Attest:

BRUCE LEHMAN

Attesting Officer

Commissioner of Patents and Trademarks